US012761491B2

(12) United States Patent
Schultz

(10) Patent No.: US 12,761,491 B2
(45) Date of Patent: Oct. 13, 2026

(54) NEAR-EYE DISPLAY RIGID FRAME BINOCULAR ALIGNMENT

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 344 days.

(21) Appl. No.: 18/568,834

(22) PCT Filed: Jun. 10, 2022

(86) PCT No.: PCT/US2022/032989
§ 371 (c)(1),
(2) Date: Dec. 10, 2023

(87) PCT Pub. No.: WO2022/261424
PCT Pub. Date: Dec. 15, 2022

(65) Prior Publication Data

US 2024/0272443 A1 Aug. 15, 2024

Related U.S. Application Data

(60) Provisional application No. 63/209,295, filed on Jun. 10, 2021.

(51) Int. Cl.
*G02B 27/01* (2006.01)
*G02B 27/42* (2006.01)

(52) U.S. Cl.
CPC ..... *G02B 27/0179* (2013.01); *G02B 27/0172* (2013.01); *G02B 27/4205* (2013.01);
(Continued)

(58) Field of Classification Search
CPC .................................................. G02B 27/0179
See application file for complete search history.

(56) References Cited

U.S. PATENT DOCUMENTS 8,593,734 B2 11/2013 Laakkonen
10,764,571 B1 9/2020 Baron
(Continued)

FOREIGN PATENT DOCUMENTS

DE 102016124702 A1 10/2017
JP 2008523433 A 7/2008
(Continued)

*Primary Examiner* — Edmond C Lau
(74) *Attorney, Agent, or Firm* — Harter Secrest & Emery LLP; Jacob D. Merrill, Esq.

(57) ABSTRACT

A method for alignment of images in a near-eye binocular display system, including providing a substantially rigid binocular frame operable to receive two or more planar waveguides, wherein each of the two or more planar waveguides include an in-coupling diffractive optic operable to diffract image-bearing light beams from an image source into the waveguide, and an out-coupling diffractive optic operable to diffract the image-bearing light beams from the waveguide toward an eyebox. The in-coupling diffractive optic is operable to in-couple light incident from a first direction and said out-coupling diffractive optic is operable to out-couple light in the first direction. Securing the binocular frame to a stationary alignment mount, positioning a first projector on a right side of the frame to project a first image and projecting the first image upon a screen without the one or more planar waveguides in place.

11 Claims, 22 Drawing Sheets

(52) U.S. Cl.
CPC ................ *G02B 2027/0134* (2013.01); *G02B 2027/0178* (2013.01)

(56) References Cited

U.S. PATENT DOCUMENTS

| | | | | | |
|---|---|---|---|---|---|
| 2013/0300637 | A1 | 11/2013 | Smits et al. | | |
| 2014/0327970 | A1* | 11/2014 | Bohn | G02B 27/0172 385/37 | |
| 2014/0375681 | A1 | 12/2014 | Robbins et al. | | |
| 2017/0293143 | A1 | 10/2017 | Martinez et al. | | |
| 2017/0363875 | A1* | 12/2017 | Yoshida | G02B 27/0176 | |
| 2019/0004325 | A1 | 1/2019 | Connor | | |
| 2019/0064526 | A1 | 2/2019 | Connor | | |
| 2019/0208187 | A1 | 7/2019 | Danziger | | |
| 2020/0143524 | A1 | 5/2020 | Selstad et al. | | |
| 2021/0026147 | A1 | 1/2021 | Harder et al. | | |
| 2021/0099691 | A1 | 4/2021 | Danziger | | |

FOREIGN PATENT DOCUMENTS

| | | | |
|---|---|---|---|
| JP | 2016161611 | A | 9/2016 |
| JP | 2017098649 | A1 | 6/2017 |
| WO | 2006064301 | A1 | 6/2006 |
| WO | 2010139848 | A1 | 12/2010 |
| WO | 2016142975 | A1 | 9/2016 |

* cited by examiner

NEAR-EYE DISPLAY RIGID FRAME BINOCULAR ALIGNMENT

TECHNICAL FIELD

This disclosure generally relates to electronic displays worn by a viewer for forming left-eye and right-eye virtual images and more particularly relates to binocular alignment in Head-Mounted Display's (HMDs).

BACKGROUND

HMDs are being developed for a range of diverse uses, including military, commercial, industrial, fire-fighting, and entertainment applications. For many of these applications, there is particular value in forming a virtual image that can be visually superimposed over the real-world image formed in the eye from within the field of view of the HMD user. Image light guides convey image-bearing light along a transmissive waveguide from a location outside the viewer's field of view to a position in alignment with the viewer's pupil while preserving the viewer's view of the environment through the waveguide.

In some image light guides, collimated, relatively angularly encoded light beams from an image source are coupled into a plate-shaped waveguide by an input coupling such as an in-coupling diffractive optic, which can be mounted or formed on a surface of the plate-shaped waveguide or buried within the waveguide. Such diffractive optics can be formed as diffraction gratings, holographic optical elements or in other known ways. After propagating along the waveguide, the diffracted light can be directed back out of the waveguide by a similar output grating, which can be arranged to provide pupil expansion along at least one dimension of the virtual image. In addition, a turning diffractive optic can be positioned along the waveguide between the input and output gratings to provide pupil expansion in a second orthogonal dimension of the virtual image. The two dimensions of pupil expansion define an expanded eyebox within which the viewer's pupil can be positioned for viewing the virtual image conveyed by the light guide.

Image light guides and diffractive optical elements may form a virtual image focused at optical infinity by conveying angularly encoded light beams of collimated light to the viewer eyebox. However, a virtual image may be focused at some closer distance, such as in the range from 1 m to 1.5 m, for example. Using near-focused solutions can allow the viewer to have the advantage of augmented reality imaging in applications where it is useful to have the real-world scene content at a close distance, such as manufacturing and warehousing applications, for example.

SUMMARY

The present disclosure provides a system and method for consistently producing properly aligned stereoscopic presentation of virtual images in a near-eye display system. Reducing or eliminating virtual image misalignment and undesirable optical effects such as incorrect coloration, blurring, and optical noise may mitigate, for example, eye strain (i.e., asthenopia).

In a first exemplary embodiment, the present disclosure provides a method for alignment of images in a near-eye binocular display system, including providing a substantially rigid binocular frame operable to receive two or more planar waveguides, wherein each of the two or more planar waveguides include an in-coupling diffractive optic operable to diffract image-bearing light beams from an image source into the waveguide, and an out-coupling diffractive optic operable to diffract the image-bearing light beams from the waveguide toward an eyebox. The in-coupling diffractive optic is operable to in-couple light incident from a first direction and said out-coupling diffractive optic is operable to out-couple light in the first direction. Securing the binocular frame to a stationary alignment mount, positioning a first projector on a right side of the frame to project a first image and projecting the first image upon a screen without the one or more planar waveguides in place. Positioning a second projector on a left side of the frame to project a second image and projecting the second image upon the screen without the one or more planar waveguides in place. Comparing the first image and the second image with respective targets and adjusting the positioning of the first projector and/or the second projector to align the first image and the second image with the respective targets.

In a second exemplary embodiment, the present disclosure provides a system for alignment of virtual images in a near-eye binocular display system, including a substantially rigid frame, a stationary alignment mount operable to secure the frame, and a screen having photodetectors operable to measure properties of calibration images. The system further including a first projector connected to a right side of the frame, wherein the first projector is operable to project a first image, and a second projector connected to a left side of the frame, wherein the second projector is operable to project a second image. The system further including one or more objective lenses operable to receive the first image at infinity focus and refocus the infinity focus image as a calibration image upon the performance screen, wherein the screen is operable to compare pixel orientation of one or more calibration images.

In a third exemplary embodiment, the present disclosure provides a method for aligning projectors with a rigid frame in a head-mounted display system independent of waveguide alignment, including securing a generally rigid binocular frame to a stationary alignment mount, wherein the binocular frame is operable to support a waveguide; positioning a first projector proximal a right side of the frame, wherein the first projector is operable to project a right image to a first location in space without a waveguide in place; positioning a second projector proximal a left side of the frame, wherein the second projector is operable to project a left image to a second location in space without a waveguide in place; positioning a screen relative to the frame at the first and second locations, the screen having photodetectors operable to receive and measure properties of the left image and the right image; comparing the measured image properties of the left image and the right image; and adjusting the positioning of at least the first projector or the second projector.

In certain embodiments of the invention, alignment may be accomplished in a factory setting prior to introduction of waveguides.

BRIEF DESCRIPTION OF THE DRAWING FIGURES

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1A:
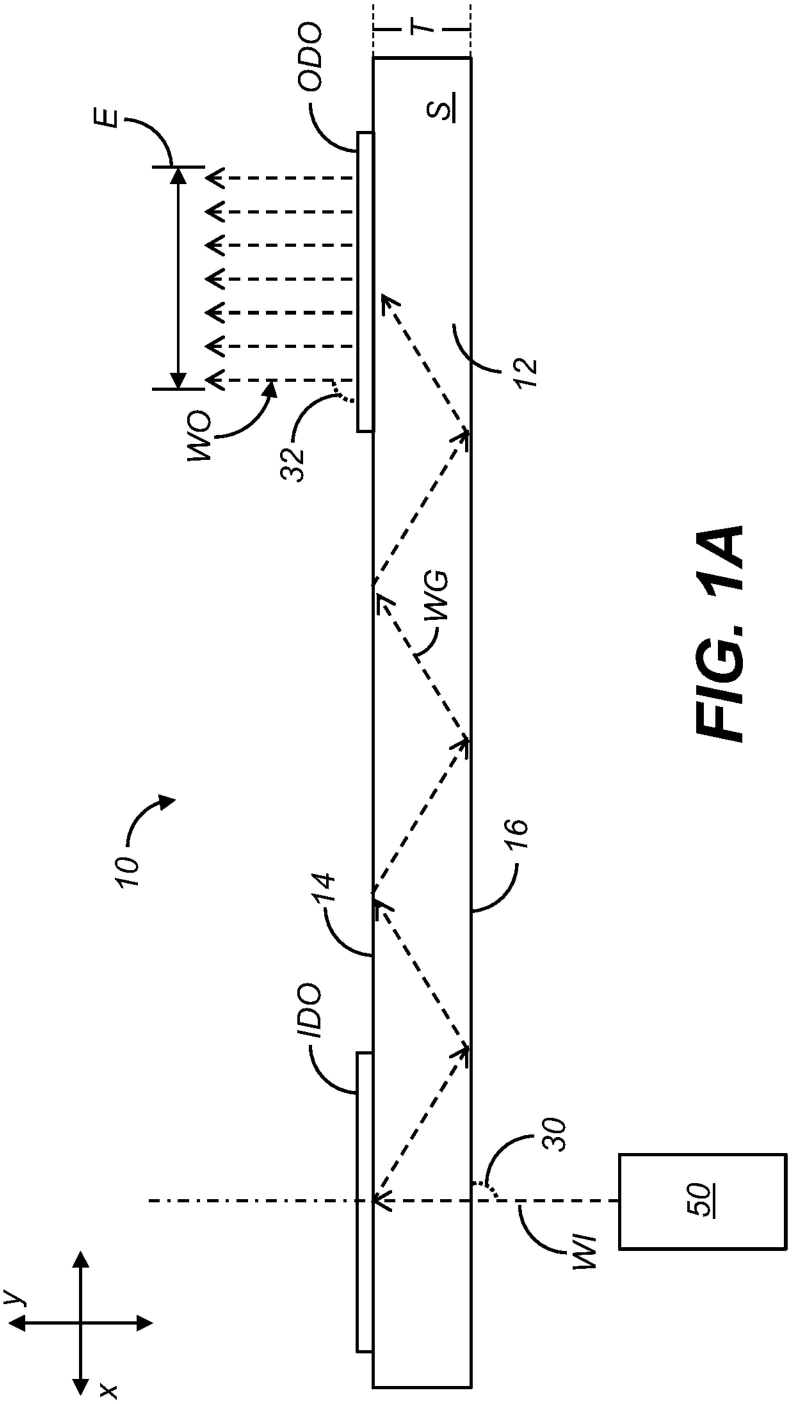
FIG. 1A is a simplified cross-sectional view of an image light guide showing the replication of an image-bearing beam along the direction of propagation for expanding one direction of an eyebox according to an exemplary embodiment of the presently disclosed subject matter.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where used herein, the terms "first", "second", and so on, do not necessarily denote any ordinal, sequential, or priority relation, but are simply used to more clearly distinguish one element or set of elements from another, unless specified otherwise.

Where used herein, the terms "viewer", "operator", "observer", and "user" are considered to be equivalent and refer to the person, or machine, who wears and/or views images using a near-eye display device.

Where used herein, the terms "coupled" or "coupler" (in the context of optics) refer to a connection by which light travels from one optical medium or device to another optical medium or device.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

Where used herein, the term "substantially" is intended to mean within the tolerance range of the equipment used to produce the value, or, in some examples, is intended to mean plus or minus 10%, or plus or minus 5%, or plus or minus 1%, unless otherwise expressly specified.

Where used herein, the terms "optical infinity" and "at infinity" correspond to conventional usage in the camera and imaging arts, indicating image formation using substantially collimated light, so that the focus distance exceeds at least about four meters (4 m).

Where used herein, the term "beam expansion" is intended to mean replication of a beam via multiple encounters with an optical element to provide exit pupil expansion in one or more directions. Similarly, as used herein, to "expand" a beam, or a portion of a beam, is intended to mean replication of a beam via multiple encounters with an optical element to provide exit pupil expansion in one or more directions.

An optical system, such as a HMD, can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

An image light guide may utilize image-bearing light from a light source such as a projector to display a virtual image. For example, collimated, relatively angularly encoded, light beams from a projector are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements (HOEs) or in other known ways. For example, the diffraction grating can be formed by surface relief. After propagating along the waveguide, the diffracted light can be directed back out of the waveguide by a similar output coupling such as an out-coupling diffractive optic, which can be arranged to provide pupil expansion along at least one direction of the virtual image. In addition, a turning grating can be positioned on/in the waveguide to provide pupil expansion in an orthogonal direction of the virtual image. The image-bearing light output from the waveguide provides an expanded eyebox for the viewer.

FIG. 1A is a schematic diagram showing a simplified cross-sectional view of one conventional configuration of an image light guide system 10. Image light guide system 10 includes a planar image light guide 12, an in-coupling diffractive optic IDO, and an out-coupling diffractive optic ODO. The image light guide 12 includes a transparent substrate S, which can be made of optical glass or plastic, with plane-parallel front and back surfaces 14, 16. In this example, the in-coupling diffractive optic IDO is shown as a transmissive-type diffraction grating arranged on, in, or otherwise engaged with the front surface 14 of the image light guide 12. However, in-coupling diffractive optic IDO could alternately be a reflective-type diffraction grating or other type of diffractive optic, such as a volume hologram or other holographic diffraction element, that diffracts incoming image-bearing light beams WI into the image light guide 12. The in-coupling diffractive optic IDO can be located on, in, or otherwise engaged with front surface 14 or back surface 16 of the image light guide 12 and can be of a transmissive or reflective-type in a combination that depends upon the direction from which the image-bearing light beams WI approach the image light guide 12.

When used as a part of a near-eye or head-mounted display system, the in-coupling diffractive optic IDO of the conventional image light guide system 10 couples the image-bearing light beams WI from a real, virtual or hybrid image source 50 into the substrate S of the image light guide 12. Any real image or image dimension formed by the image source 50 is first converted into an array of overlapping, angularly related, collimated beams encoding the different positions within a virtual image for presentation to the in-coupling diffractive optic IDO. Typically, the rays within each bundle forming one of the angularly related beams extend in parallel, but the angularly related beams are relatively inclined to each other through angles that can be defined in two angular dimensions corresponding to linear dimensions of the image.

Once the angularly related beams engage with the in-coupling diffractive optic IDO, at least a portion of the image-bearing light beams WI are diffracted (generally through a first diffraction order) and thereby redirected by in-coupling diffractive optic IDO into the planar image light guide 12 as angularly encoded image-bearing light beams WG for further propagation along a length dimension x of the image light guide 12 by total internal reflection (TIR) between the plane-parallel front and back surfaces 14 and 16. Although diffracted into a different combination of angularly related beams in keeping with the boundaries set by TIR, the image-bearing light beams WG preserve the image information in an angularly encoded form that is derivable from the parameters of the in-coupling diffractive optic IDO. The out-coupling diffractive optic ODO receives the encoded image-bearing light beams WG and diffracts (also generally through a first diffraction order) at least a portion of the image-bearing light beams WG out of the image light guide 12, as image-bearing light beams WO, toward a nearby region of space referred to as an eyebox E, within which the transmitted virtual image can be seen by a viewer's eye or other optical component. The out-coupling diffractive optic ODO can be designed symmetrically with respect to the in-coupling diffractive optic IDO to restore the original angular relationships of the image-bearing light beams WI among outputted angularly related beams of the image-bearing light beams WO. In addition, the out-coupling diffractive optic ODO can modify the original field points positional angular relationships producing an output virtual image at a finite focusing distance.

However, to increase one dimension of overlap among the angularly related beams populating the eyebox E (defining the size of the region within which the virtual image can be seen), the out-coupling diffractive optic ODO is arranged together with a limited thickness T of the image light guide 12 to encounter the image-bearing light beams WG multiple times and to diffract only a portion of the image-bearing light beams WG upon each encounter. The multiple encounters along the length (e.g., a first direction) of the out-coupling diffractive optic ODO have the effect of replicating the image-bearing light beams WG and enlarging or expanding at least one dimension of the eyebox E where the replicated beams overlap. The expanded eyebox E decreases sensitivity to the position of a viewer's eye 5 for viewing the virtual image.

The out-coupling diffractive optic ODO is shown as a transmissive-type diffraction grating arranged on or secured to the front surface 14 of the image light guide 12. However, like the in-coupling diffractive optic IDO, the out-coupling diffractive optic ODO can be located on, in, or otherwise engaged with the front or back surface 14, 16 of the image light guide 12 and can be of a transmissive or reflective-type in a combination that depends upon the direction through which the image-bearing light beams WG is intended to exit the image light guide 12. In addition, the out-coupling diffractive optic ODO could be formed as another type of diffractive optic, such as a volume hologram or other holographic diffraction element, that diffracts propagating image-bearing light beams WG from the image light guide 12 as the image-bearing light beams WO propagating toward the eyebox E.

When the image source 50 is arranged to emit the image-bearing light beams WI towards the image light guide 12 from a position opposite to the front surface 14 through which the image-bearing light beams WO are conveyed, that is, directing the approach of the angularly related image-bearing light beams WI towards surface 16, image-bearing light beams WO will be emitted through the out-coupling diffractive optic ODO on the surface 14 at a vector equal to the angle of incidence, rendering image-bearing light beams WI and image-bearing light beams WO parallel in angular space. FIG. 1A shows that image-bearing light beams WI incident on a surface 16 at an angle of incidence 30 normal to the surface 16 produce image-bearing light beams WO emitted from surface 14 at an exit angle 32 normal to the surface 14. As illustrated in FIG. 1A, angle of incidence 30 and exit angle 32 are equal with respect to surface 16 and surface 14.

Figure 1B:
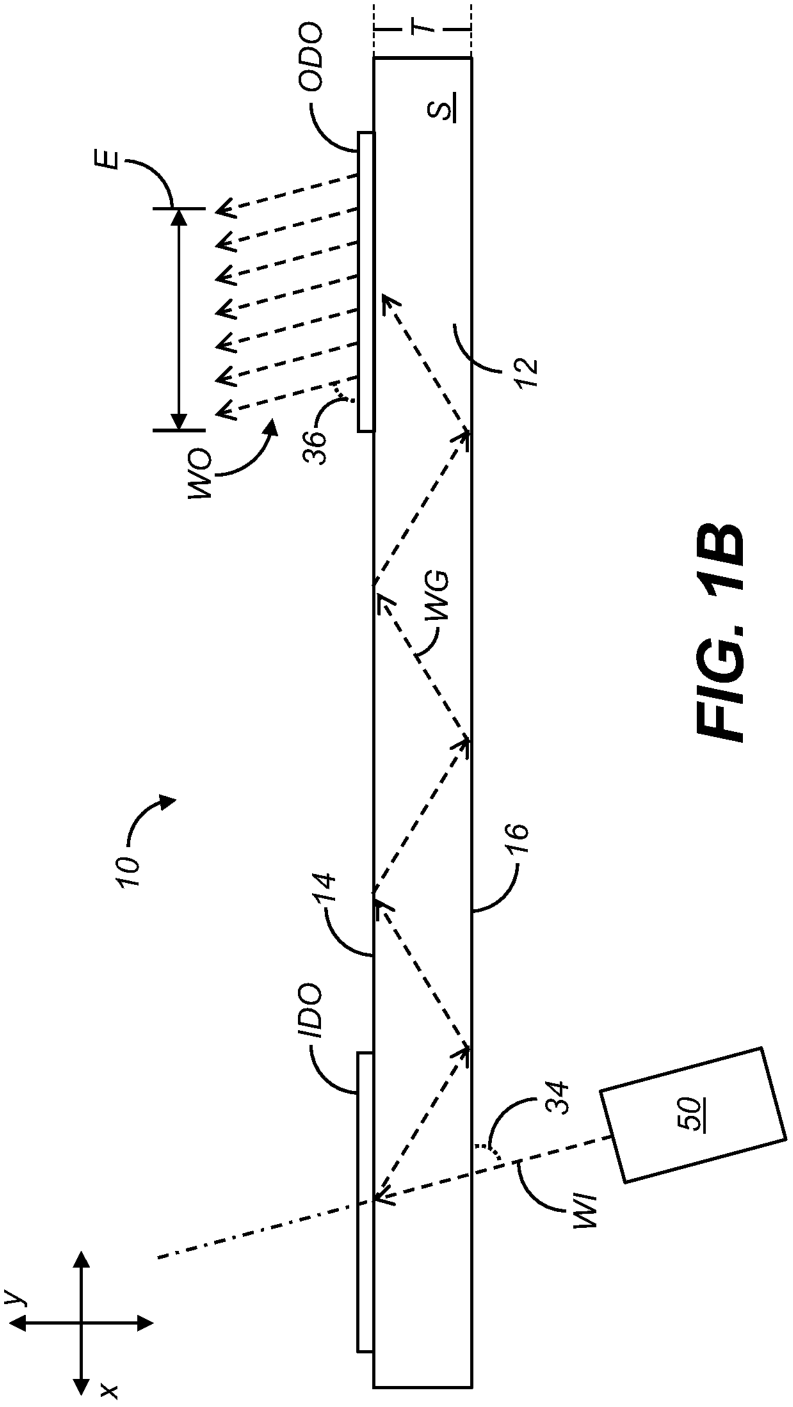
FIG. 1B is a schematic side view of an image light guide showing the consistent angular relationship between an in-coupled light ray vector and light rays emitted by the out-coupling diffractive optic according to an exemplary embodiment of the presently disclosed subject matter.

FIG. 1B illustrates non-normal incident image-bearing light beams WI having an angle of incidence 34 and image-bearing light beams WO emitted from surface 14 at a non-normal exit angle 36. The exit angle 36 of the outgoing beam WO is equal to the angle of incidence 34.

Figure 1C:
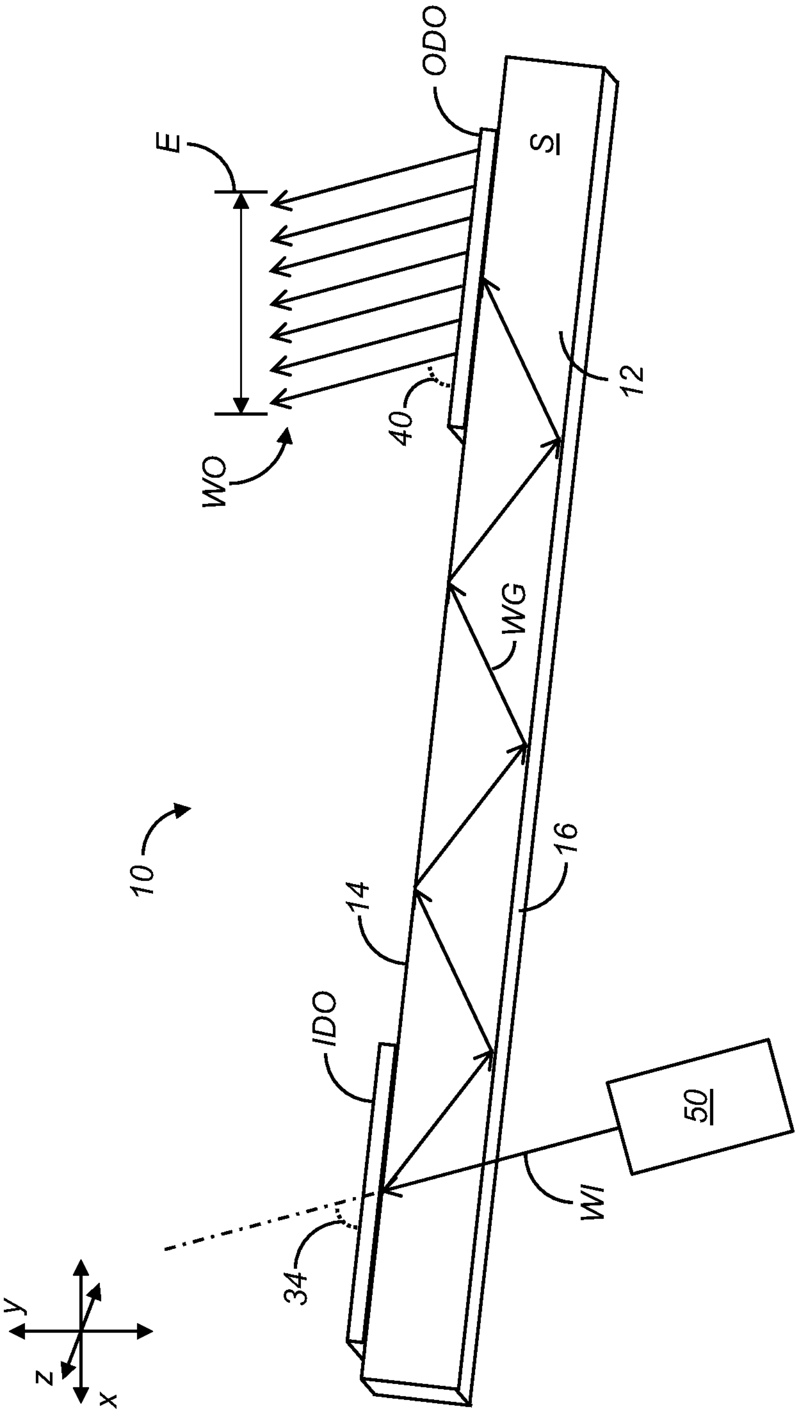
FIG. 1C is a schematic side view of an image light guide positioned at a non-normal angle with respect to an in-coupling light ray showing the consistent angular relationship between an in-coupled light ray vector and light rays emitted by the out-coupling diffractive optic.

In an embodiment, as illustrated in FIG. 1C, the angle of incidence 34 of the image-bearing light beams WI and the exit angle 40 of the image-bearing light beams WO are changed, but the relationship of the angle of incidence 34 and the exit angle 40 is maintained. The angle of incidence 34 and the exit angle 40 are equal and independent of the roll, pitch, and yaw of the waveguide 12, 12*a*. The relationship of the angle of incidence 34 and the exit angle 40 is a function of the image-bearing light beam WI being incident upon the in-coupling diffractive optic IDO from the side of the waveguide 12 opposite of the eyebox E. If the image-bearing light beam WI is incident upon the in-coupling diffractive IDO on the same side of the waveguide 12 as the eyebox E, the relationship of the angle of incidence 34 and the exit angle 40 is not independent of the roll, pitch, and yaw of the waveguide 12. As described in detail herein, this angle relationship enables the method for aligning and calibrating projectors in a rigid frame binocular system disclosed herein.

Figure 2A:
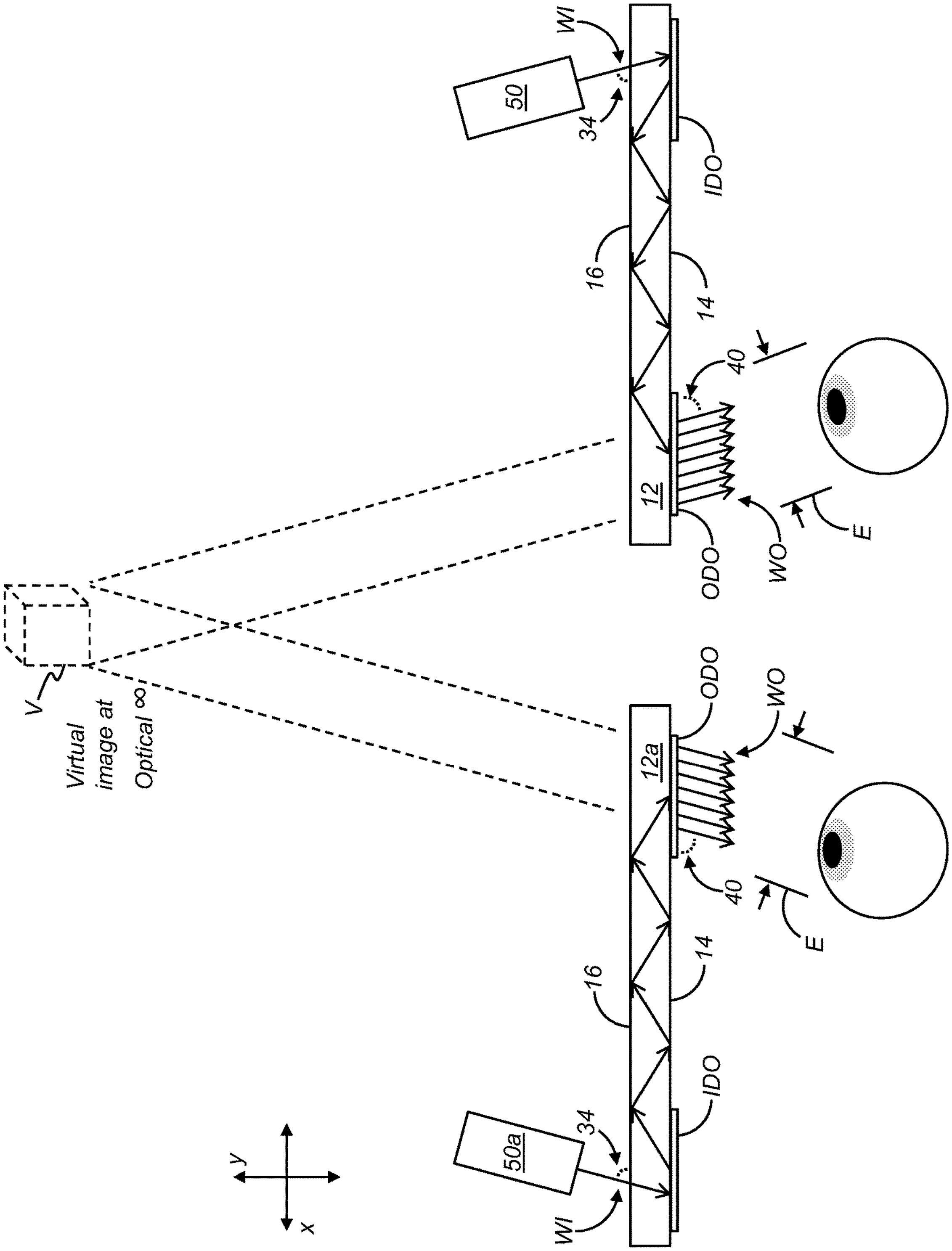
FIG. 2A is a schematic top view of binocular image light guides showing the consistent angular relationship between an in-coupled light ray vector and light rays emitted by the out-coupling diffractive optic.
Figure 2B:
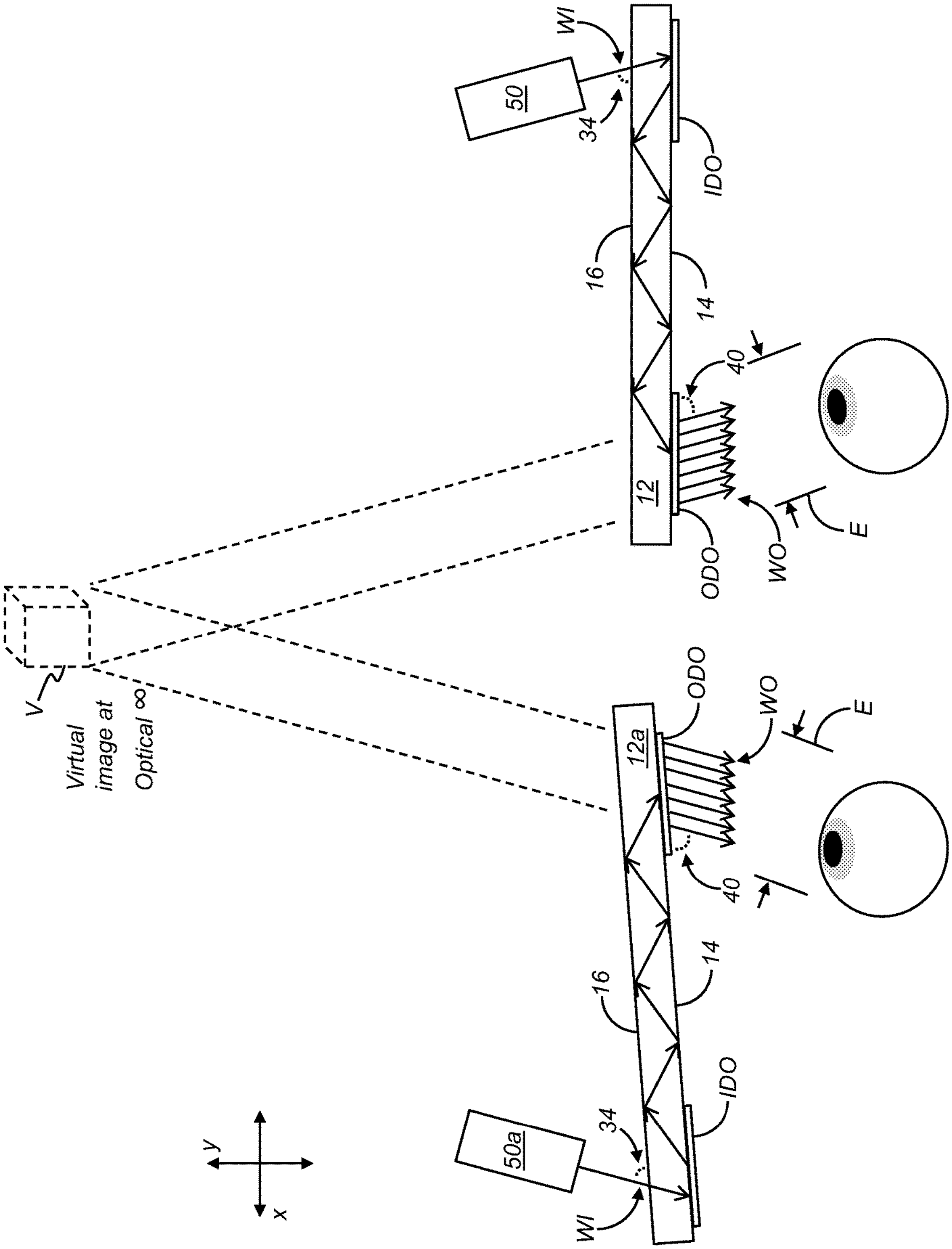
FIG. 2B is a schematic top view of binocular image light guides showing the consistent angular relationship between an in-coupled light ray vector and light rays emitted by the out-coupling diffractive optic.

FIGS. 2A and 2B show that the relationship of the angle of incidence 34 and the exit angle 40 is maintained (when the image-bearing light beam WI is incident upon the in-coupling diffractive optic IDO from the side of the waveguide 22 opposite of the eyebox E) even though the alignment of one or more of the waveguides 12, 12*a* relative to one or more of the, respective, projectors 50, 50*a* is changed. In other words, the alignment of the waveguides 12, 12*a* relative to the projectors 50, 50*a* does not affect the alignment virtual images V at optical infinity.

Figure 3A:
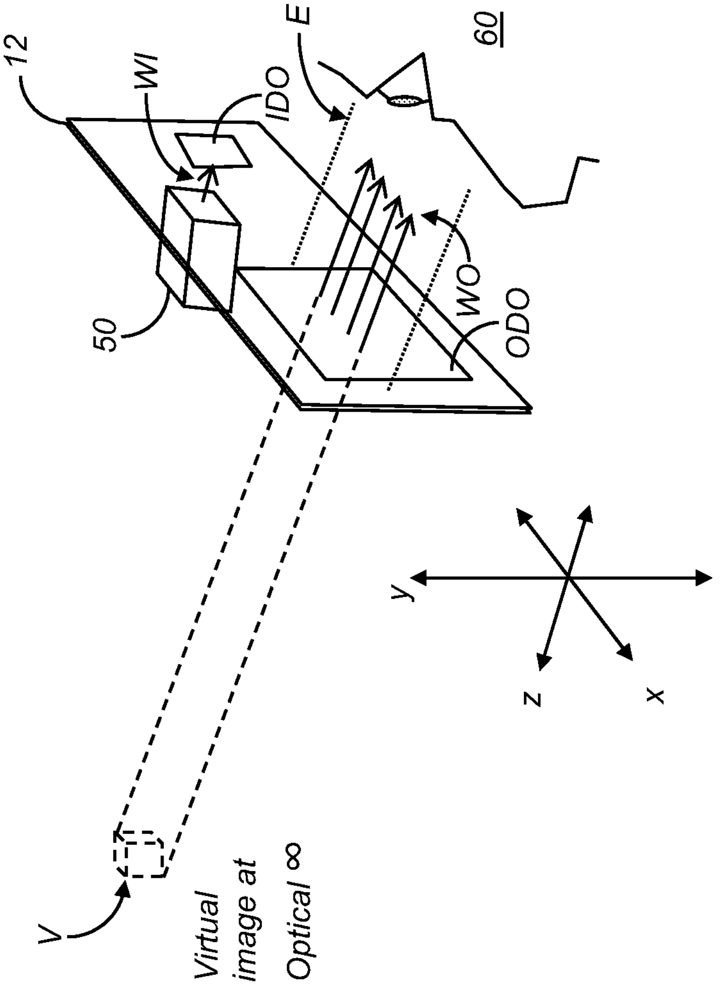
FIG. 3A is a top elevational perspective view of an image light guide with rearward facing projector conveying a virtual image seen at infinity within a viewer's field of view according to an embodiment of the present disclosure.

The perspective view of FIG. 3A shows a waveguide 12 arranged to diffract image-bearing light beam WI projected at a pre-configured angle of incidence with the waveguide 12 optimized to present a virtual image V fixed in angular space to the viewer 60. Rearward facing projector 50 is operable to transmit image-bearing light beam WI to the in-coupling diffractive optic IDO, and may do so without mechanical contact with waveguide 12. A mounting apparatus such as an eyeglass lens frame, helmet mounting, waveguide encasement or other mounting. may be utilized to secure the projector 50 and/or the waveguide 12.

Figure 3B:
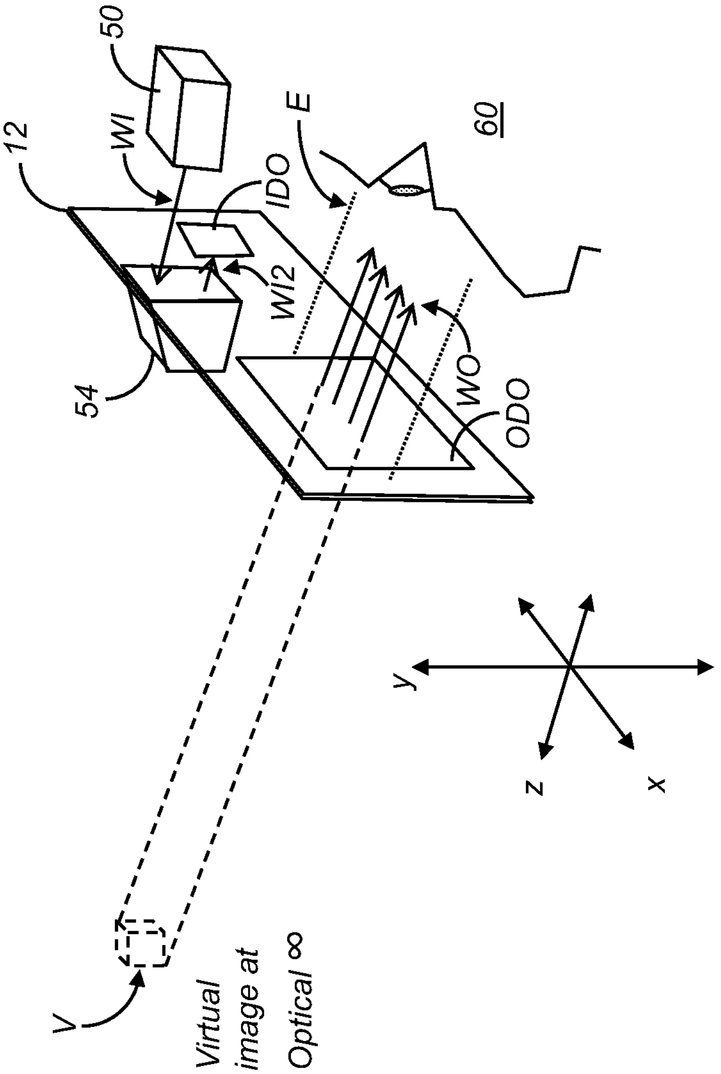
FIG. 3B is a top elevational perspective view of an image light guide with forward facing projector conveying a virtual image seen at infinity within a viewer's field of view according to an embodiment of the present disclosure.

In an exemplary embodiment, as shown in FIG. 3B, the projector 50 is positioned frontward/forward facing with respect to viewer 60. In order to achieve angular congruence between image-bearing light beam WI and image-bearing light beam WO, an optical element 54, such as, without limitation, a mirror, Dove prism, fold prism, pentaprism or a combination of the like, is arranged to direct image-bearing light beam WI as image-bearing light beam WI2 toward the in-coupling diffractive optic IDO from the requisite (rearward facing) direction opposite the eyebox E. A mounting apparatus may be arranged to secure the optical element 54 and the projector 50 in relationship with each other, independent of the presence or orientation of the waveguide 12.

Figure 4:
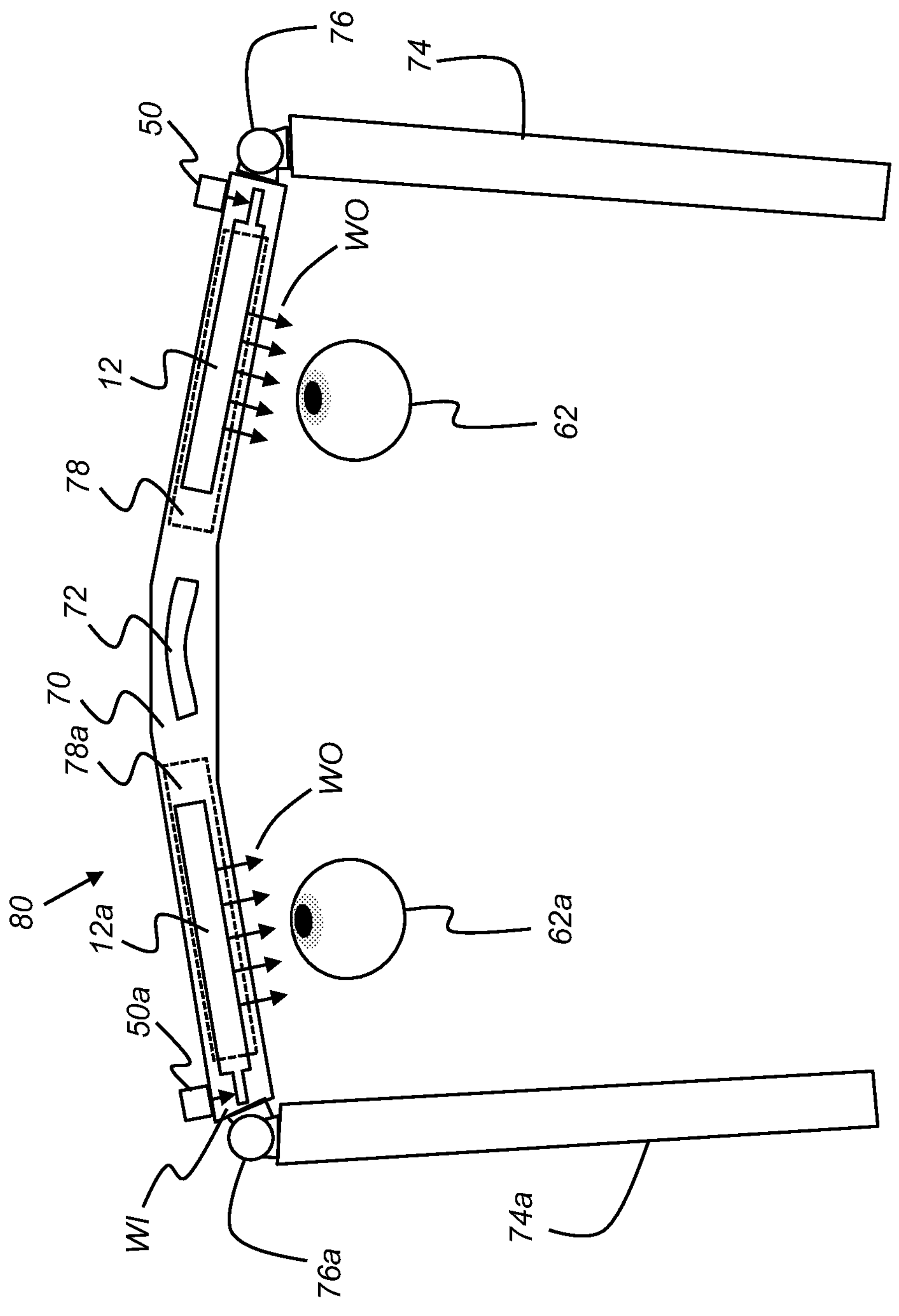
FIG. 4 is a simplified top view schematic diagram of a head mounted display apparatus conveying outcoupled light to a viewer's field of view.

FIG. 4 shows an embodiment of a head mounted near eye display system 80 with a chevron shape. In another embodiment, head mounted near eye display system 80 may have a variety of shapes including, but not limited to, wrap frames, sport and swim goggles, traditional glasses frames, and protective goggles. Head mounted near eye display system 80 may include a plurality of flexure points, including arm hinge 76, 76*a*, as well as a nose bridge 72, temple frame 74, 74*a*, and lens frame 70. In order to maintain separation of waveguides 12, 12*a* from projectors 50, 50*a*, lens frame 70 is operable to function as a mount for rearward facing projectors 50, 50*a*. This configuration offers several advantages. With respect to the properties of angularly encoded outgoing beams WO exiting waveguides 12, 12*a* at an angle equal to the incoming beam WI relative to the position of eyes 62, 62*a* of the viewer, the lens frame 70) provides the most stable location operable for mounting projectors 50, 50*a*. Stereoscopic vergence of outgoing beam WO can be achieved more reliably given the general rigidity and limited flexure available to lens frame 70. Waveguide 12 is operable to shift position or become misaligned within head mounted near eye display system 80 without impact to the factory calibrated alignment of stationary mounted projectors 50, 50*a*, and without impact to the presentation of the virtual image V referenced in FIG. 3B. Returning to FIG. 4, waveguide replacement ports 78, 78*a* permits waveguides 12, 12*a* to be removed from head mounted near eye display system 80 and replaced without impact to the factory calibrated alignment of stationary mounted projectors 50, 50*a*.

Figure 5:
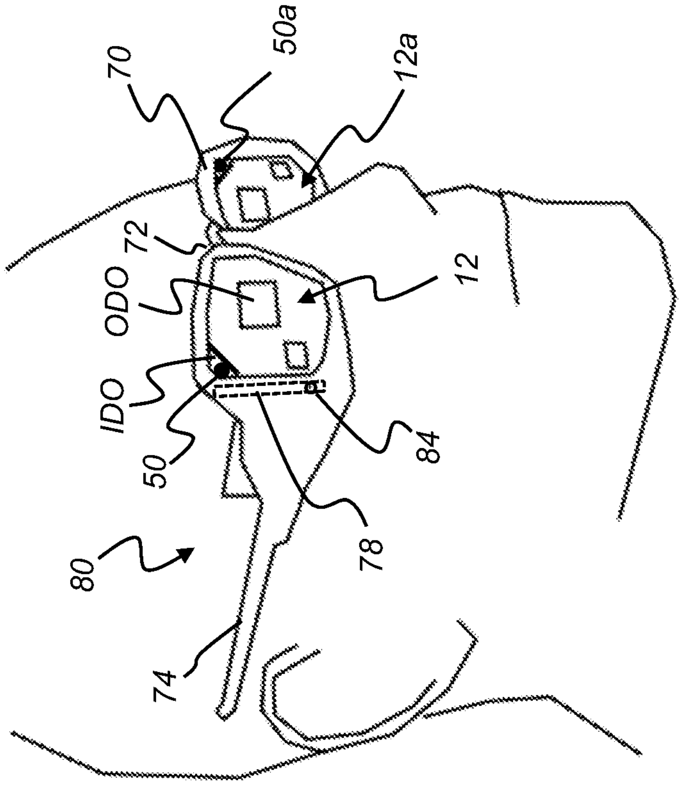
FIG. 5 illustrates head mounted near eye display system worn by a viewer.

In an embodiment, waveguides 12, 12*a* connect with the head mounted near eye display system 80 by means of an easily accessible input mechanism, via sliding into place through waveguide replacement ports 78, 78*a* in the side of the lens frame 70 as shown in FIG. 5. Waveguide replacement port 78 may employ a rubber seal, plastic clip, or small screw 84 to secure the installed waveguides 12, 12*a*. In another embodiment, the waveguide replacement port 78 may be located on/in the top or bottom of the lens frame 70. Waveguide 12 is operable for insertion into waveguide replacement port 78 either by inserting the side of the waveguide 12 with the out-coupling diffractive optic ODO first, or the side with the in-coupling diffractive optic IDO first, or the top or bottom sides, depending on the orientation of waveguide replacement port 78 relative to head mounted near eye display system 80. When inserted. waveguides 12, 12*a* locks into position by means of a tension mechanism that can be engaged through a spring loaded pressure clip, snap clamp, spring clip or the like.

Figure 6A:
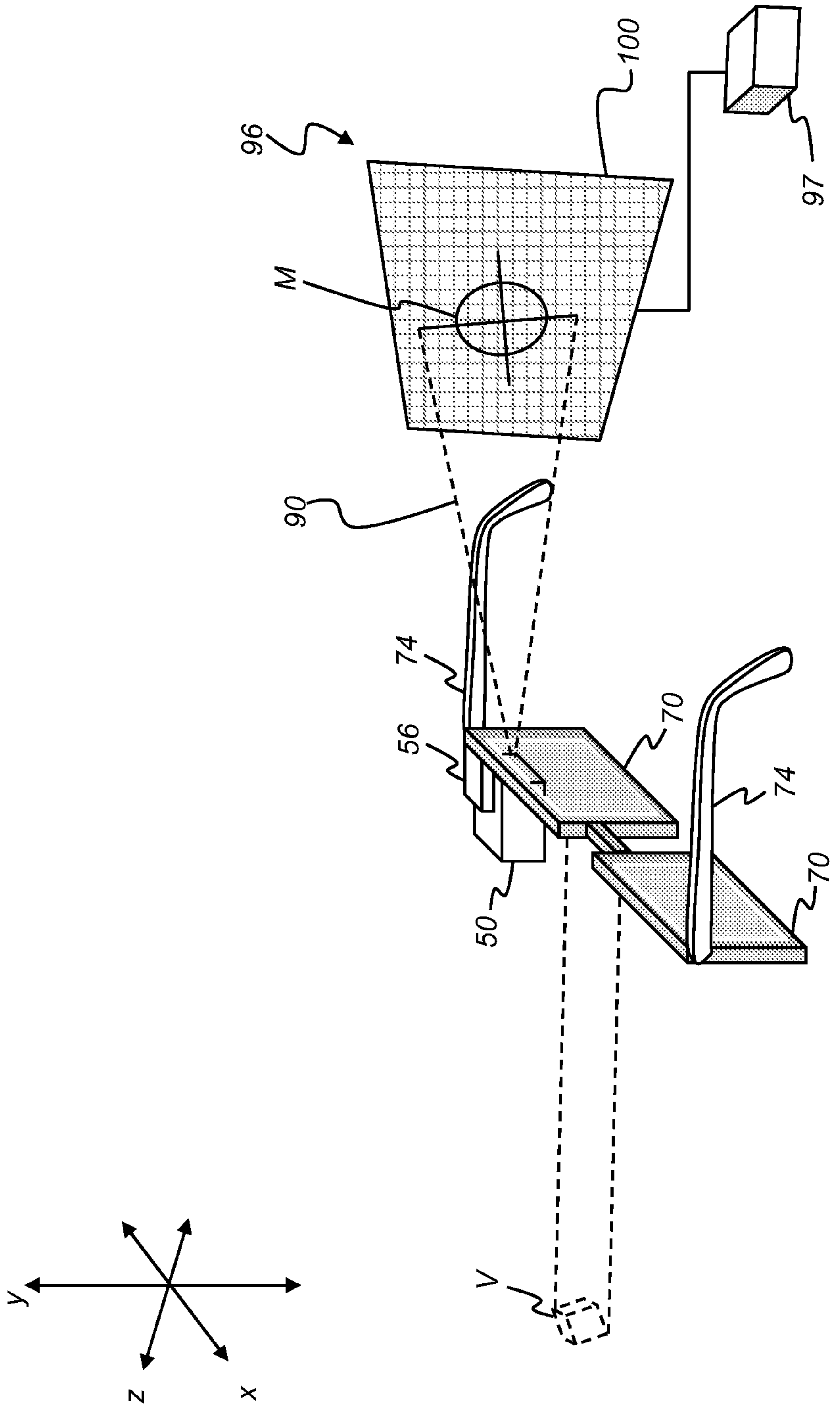
FIG. 6A is a top elevational perspective view of a projector forming an image upon a screen at some distance from a viewer.

When replaced, waveguides 12, 12*a* do not require fine tuning of their position once inserted. Rather, controlled focal vergence is achieved by factory alignment of projector 50, 50*a*. Referring now to FIG. 6A, the projector 50 is operable to generate images at infinity focus and a full set of image-bearing light beams 90, corresponding to individual pixels within an image. As illustrated in FIG. 6A, in an embodiment, during alignment of the rearward facing/projecting projector(s) 50, 50*a*, the projector(s) 50, 50*a* are mounted to the lens frame 70 without the waveguide 12, 12*a* in place. The set of image-bearing light beams 90 produce an image M that can be viewed without requiring the waveguide 12, 12*a* to decode the image-bearing light. Image-bearing light beams 90 transmitted by the projector 50, 50*a* are operable to produce the intended image M upon a surface, such as performance screen 96, without the presence of waveguide 12. In an embodiment, the performance screen 96 includes a digital sensor array comprising photodetectors in communication with a controller 97 operable to receive and measure various properties of a calibration image. For example, the digital sensor array may comprise area charge-coupled devices (CCD), complementary metal-oxide-semiconductors (CMOS), and/or photodiodes. In another embodiment, the performance screen 96 includes a generally planar surface without a digital sensor array.

Figure 6B:
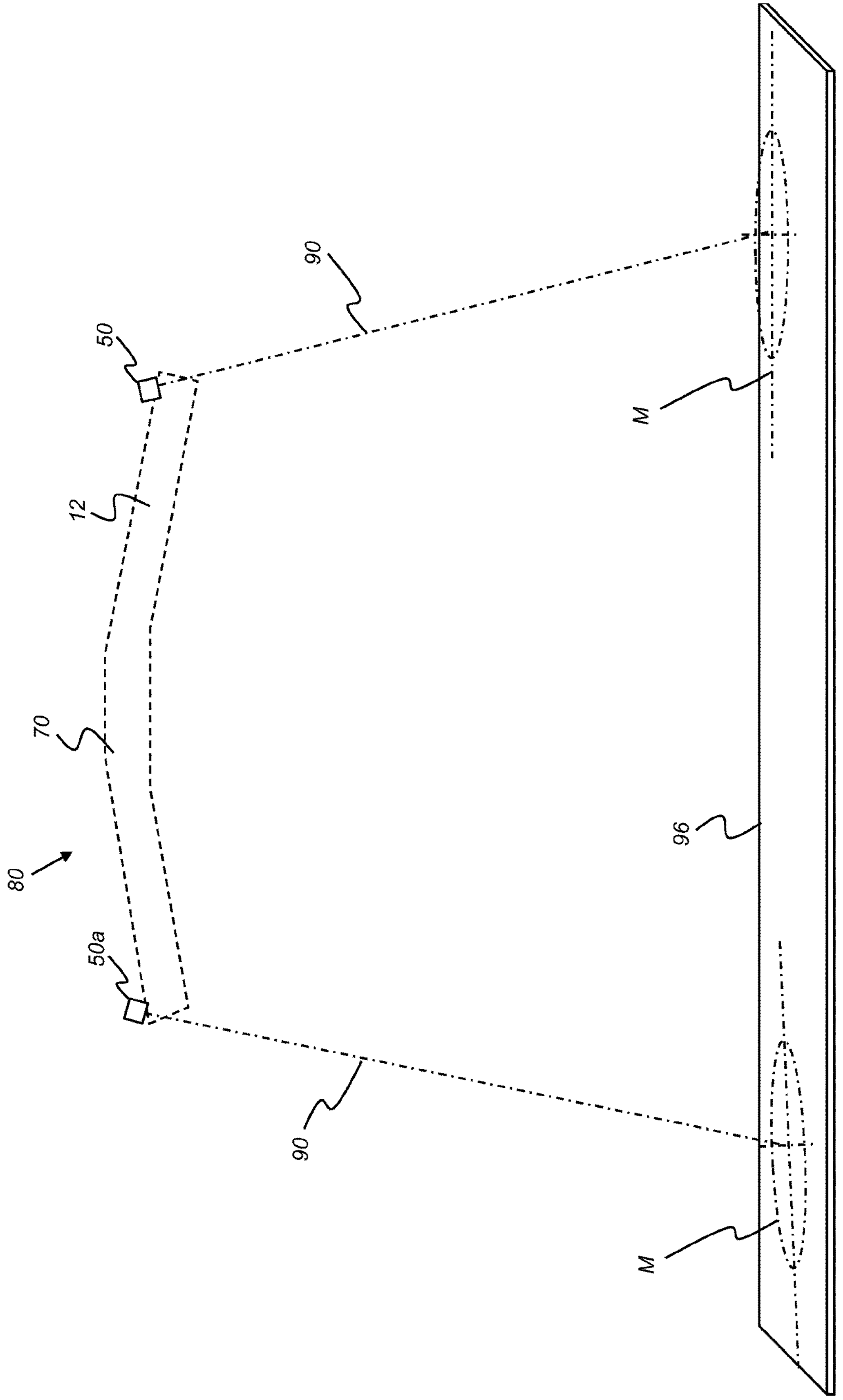
FIG. 6B is a simplified top view schematic diagram of a head mounted display apparatus projecting light from rearward facing projectors upon a screen.

FIG. 6B illustrates a generally top-down perspective view of an embodiment of an image calibration scheme. Mounted to lens frame 70, the left side projector 50 and the right side projector 50*a* are operable to project image-bearing light beams 90 upon the performance screen 96 set at a predetermined distance. Image-bearing light beams 90 create a real image M. Where the left and right side projectors 50, 50*a* are both utilized, two images M are produced upon the performance screen 96. Image M may be further adjusted according to projector alignment methods described below. The projector alignment methods may be performed within a manufacturing environment.

In an embodiment, projector alignment is manually performed by a human operator. For example, an operator may project image-bearing light beams 90 from each projector 50, 50*a* onto the projector screen 96, and align images M on the performance screen 96 by eye to effect the projector alignment.

Figure 6C:
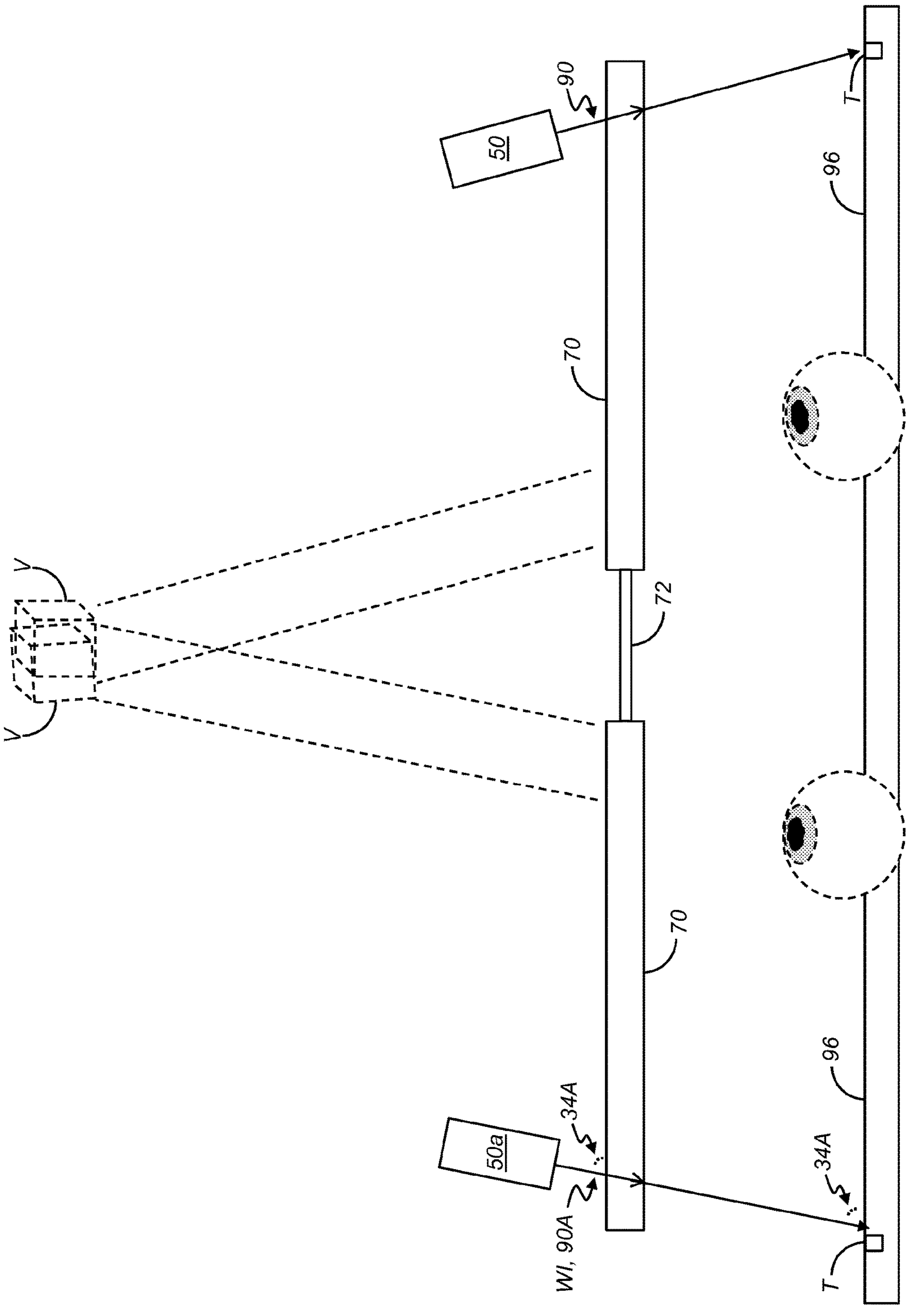
FIG. 6C is a simplified top view schematic diagram of a head mounted display apparatus projecting light from misaligned rearward facing projectors upon two screens.
Figure 6D:
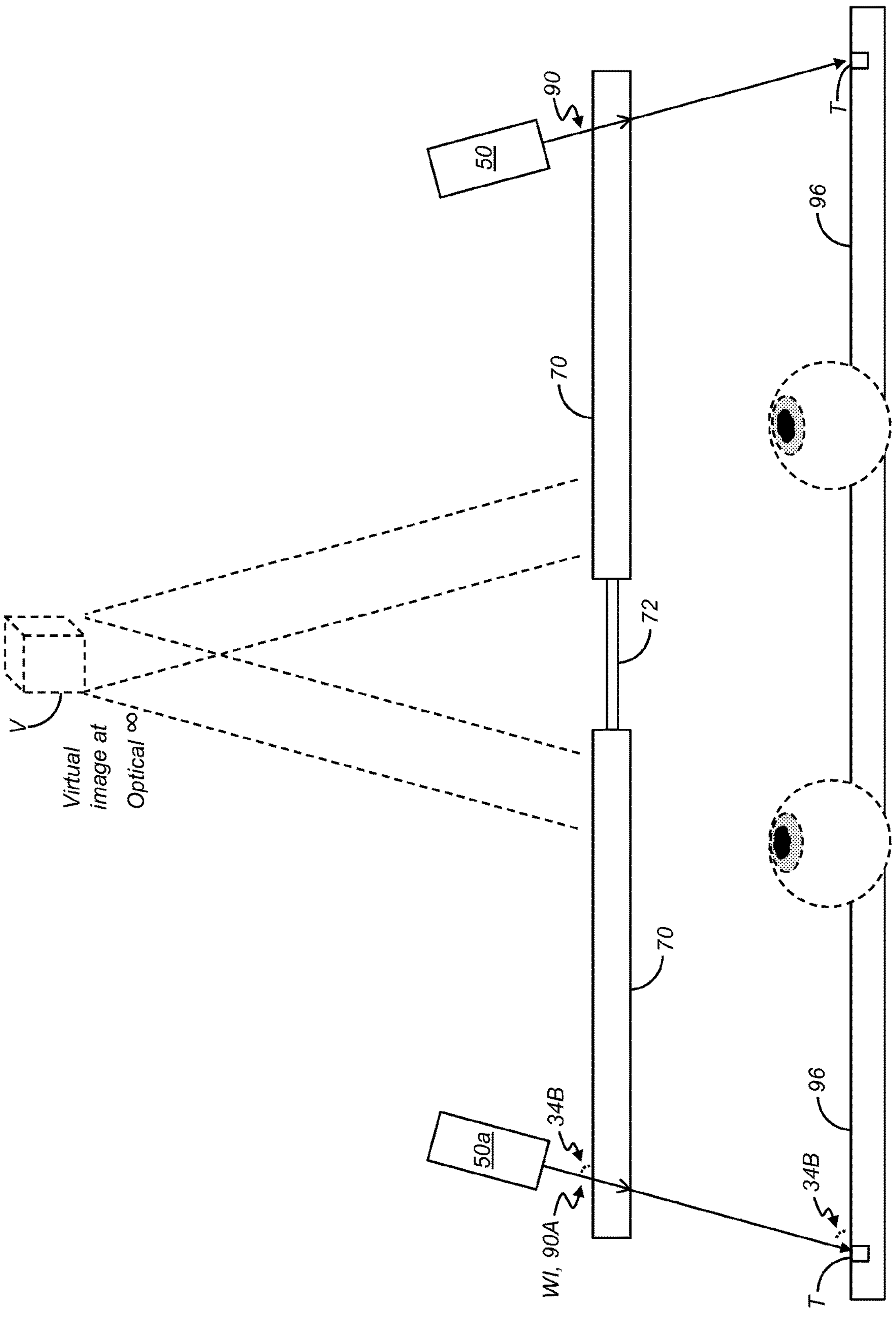
FIG. 6D is a simplified top view schematic diagram of a head mounted display apparatus according to FIG. 6C having the rearward facing projectors aligned.

As illustrated in FIGS. 6C and 6D, in an embodiment, the performance screen 96 is utilized during calibration of the projectors 50, 50*a*. In another embodiment, two performance screen 96, one for each projector 50, 50*a*, may be utilized during calibration. In FIG. 6C, the projector 50*a* is misaligned such that a non-normal incoming beam WI has an angle of incidence 34A on the performance screen 96, and would therefore cause distortion of the virtual image V (the virtual image V is shown for reference, but is not produced without waveguide 12, 12*a*). In FIG. 6D, the projector 50*a* is aligned such that a non-normal incoming beam WI has an angle of incidence 34B on the performance screen 96, and the stereoscopic virtual image V produced when the waveguides 12, 12*a* are installed is aligned. In an embodiment, the performance screen 96 includes a target T with which the image-bearing light beams 90 are aligned. When the performance screen 96 does not utilize a sensor array, the target T may be an image such as a reticle. When the performance screen 96 utilizes a sensory array, the target T may be a selection of pixels.

Figure 7:
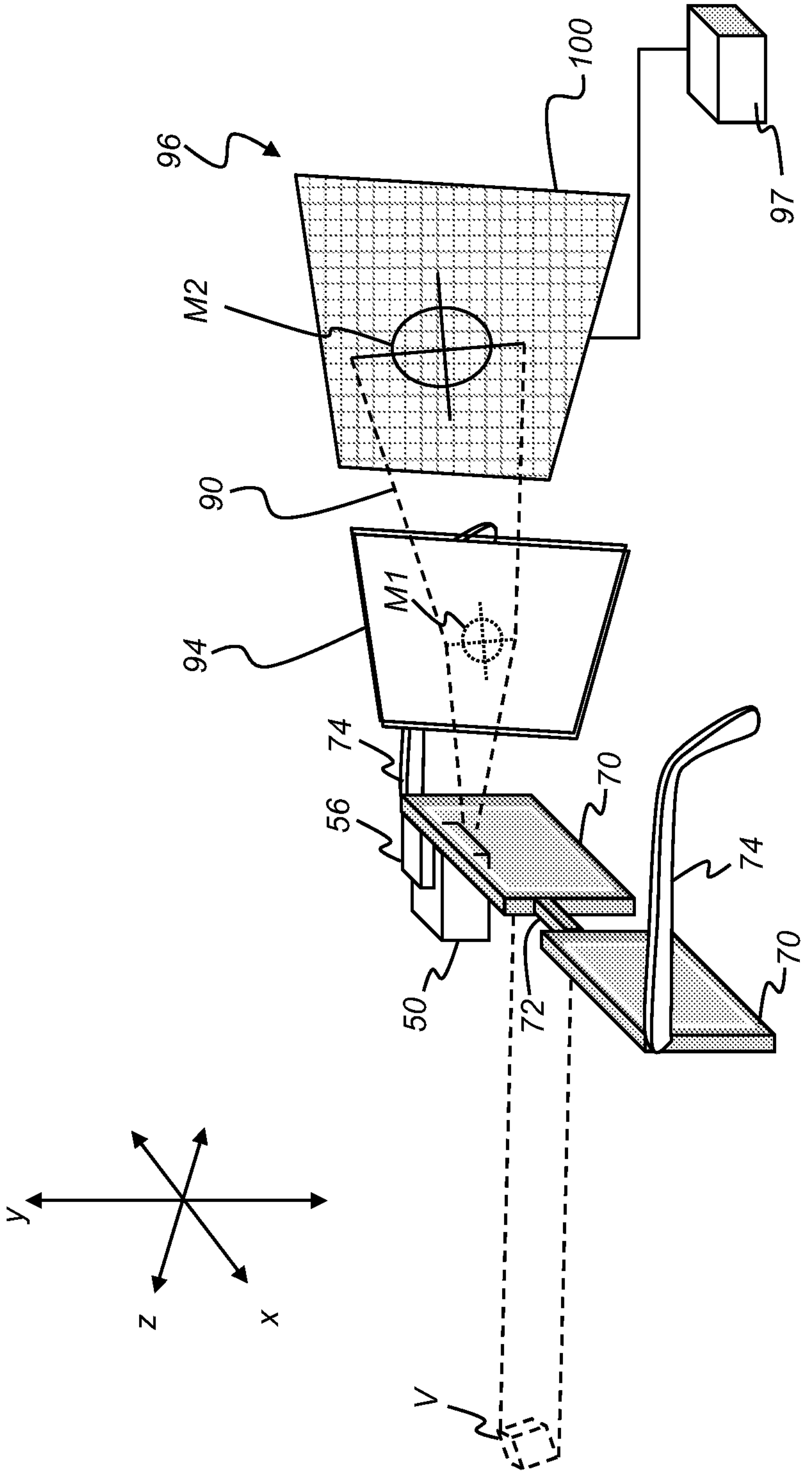
FIG. 7 is a top elevational perspective view of an image projector forming an image upon an intermediary adjustment element operable to refocus image upon another screen positioned at a distance.

Referring now to FIG. 7, in an embodiment, to accommodate the projector 50 transmitting image-bearing light beams 90 at infinity focus, an intermediary adjustment element is utilized to achieve focus onto the performance screen 96. In an embodiment, the intermediary adjustment element is an objective lens 94, or similar optical system (e.g., diopter lens), operable to receive the image-bearing light beams 90 at infinity focus, and focus the infinity focus image M1 upon the performance screen 96 as a calibration image M2. In an embodiment the intermediary adjustment element 94 is operable to magnify the infinity focus image M1 on the performance screen as calibration image M2.

In an embodiment, performance screen 96 includes photodetector devices in communication with the controller 97 operable to receive and measure various properties of calibration image M2. Constructed with optical detectors responsive to, but not limited to, timing precision and pulse frequency, spectral region, lumens or light intensity, and pixel orientation, performance screen 96 enables a method for ensuring projector 50 light output meets desired or pre-set requirements. In an embodiment, performance screen 96 also includes a pixel grid 100 operable to compare pixel orientation of calibration image M2 to a reference pixel or pre-set factory alignment scheme. In an embodiment, the reference pixel appears in the center of calibration image M2. In another embodiment, the reference pixel is located in various regions of the image. For example, pixel alignment may be defined as the visual angle of one pixel on a device with a pixel density of ninety-six dots per inch ("96 dpi") and visual angle of 0.0213 degrees, with an acceptable margin of error of 0.005 degrees.

In an embodiment, performance screen 96 is operable to account for unwanted effects on the image-bearing light beams 90 caused by the objective lens 94, including chromatic aberrations and other wavelength dependent optical distortions apparent in image M2. In certain aspects, such unwanted effects are aberrations and/or distortions known to be present in objective lens 94. A method of finer calibration of projector 50 to correct for peripheral pixel alignment, color adjustment, and the like includes the use of alignment system software implementing image processing algorithms. The software alignments may occur before and/or after course alignment, as described in the example in FIG. 10.

In an embodiment, the alignment mount and mounting bracket 56 (shown in FIGS. 7, 8, and 13-15) is operable to provide a mechanical means for aligning the projection of image M1 about the X, Y and Z axis. The projectors 50, 50*a* may be manually and/or electronically aligned. In an embodiment, the mounting bracket 56 includes adjustment screws 57 operable adjust the roll, pitch, and yaw of the projectors 50, 50*a*.

Figure 8:
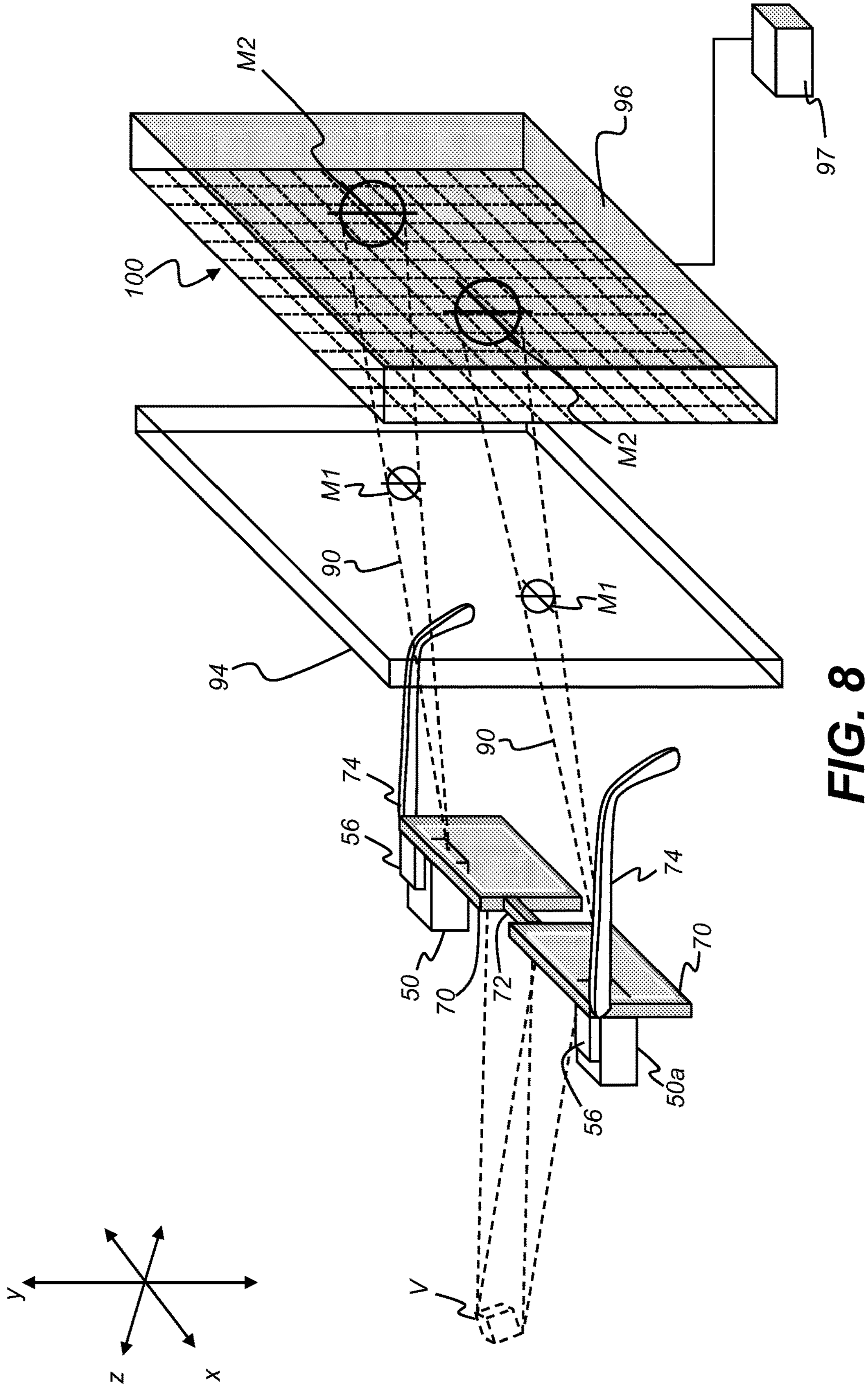
FIG. 8 is a top elevational perspective view of a pair of image projectors forming a stereoscopic image that is then refocused through an intermediary adjustment element upon an alignment screen positioned at a distance.

As illustrated in FIG. 8, in an embodiment, the right and left side projectors 50, 50*a* of the head mounted near eye display system 80 are aligned without waveguides 12, 12*a* installed. This configuration includes a second projector, projector 50*a*, operable to a deliver stereoscopic optical experience to viewer 60. Projector 50 is operable for initial coarse alignment via a reference pixel alignment scheme, and factory calibration of image region M2 with performance screen 96. Once projector 50 has achieved image display quality and accuracy specifications, the second projector 50*a* may be similarly aligned to ensure the image-bearing light beams 90 transmitted by the second projector 50*a* to achieve convergence with the image-bearing light beams 90 transmitted by the projector 50.

Figure 9:
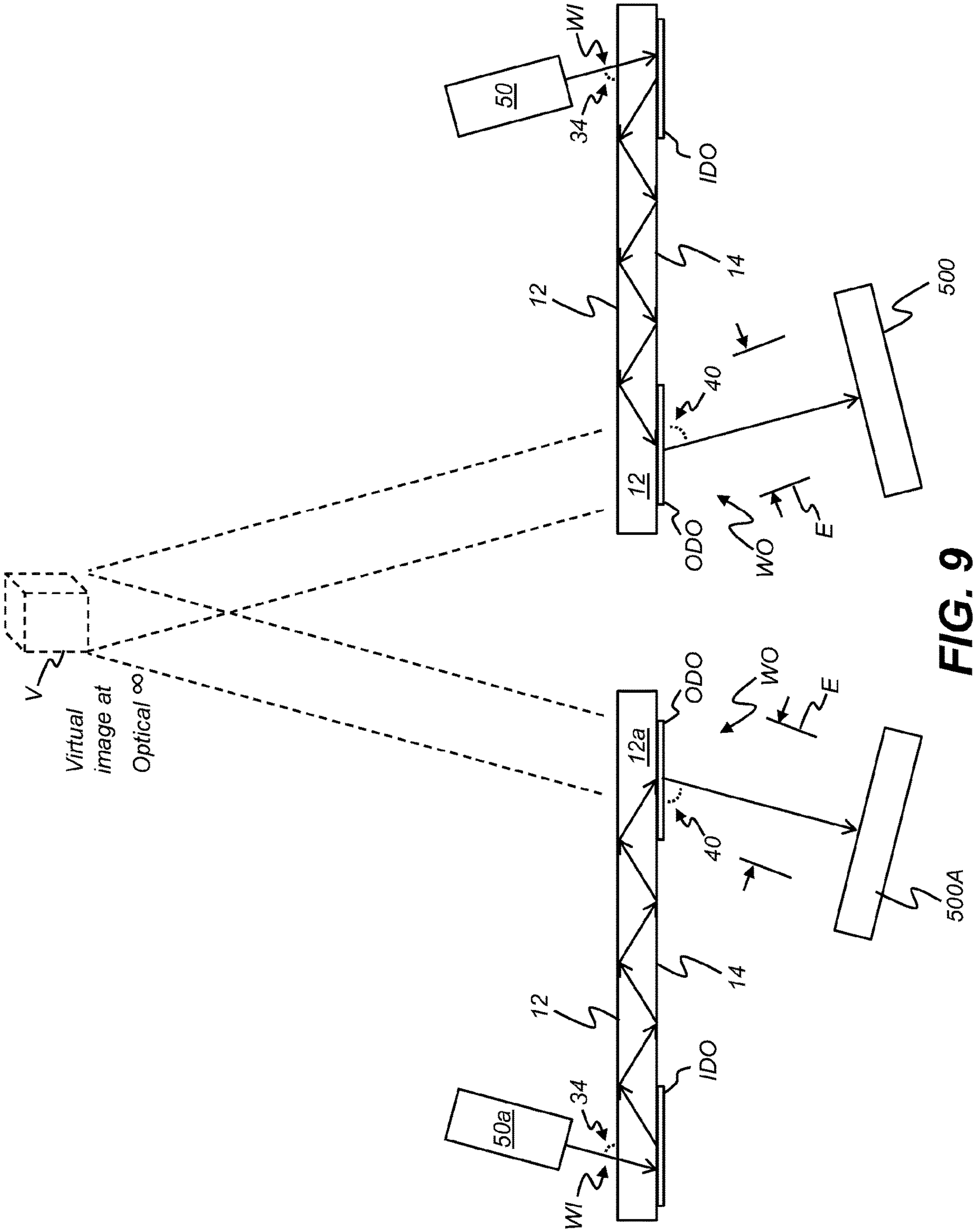
FIG. 9 is a schematic top view of binocular image light guides with rearward facing projectors emitting light onto two cameras.

As illustrated in FIG. 9, in an embodiment, projector alignment may be performed with the waveguides 12, 12*a* installed. In this embodiment, cameras 500, 500A are located within the eyebox E. The real-image captured by the cameras 500, 500A are then utilized to calibrate the projector 50, 50*a* alignment.

Figure 13:
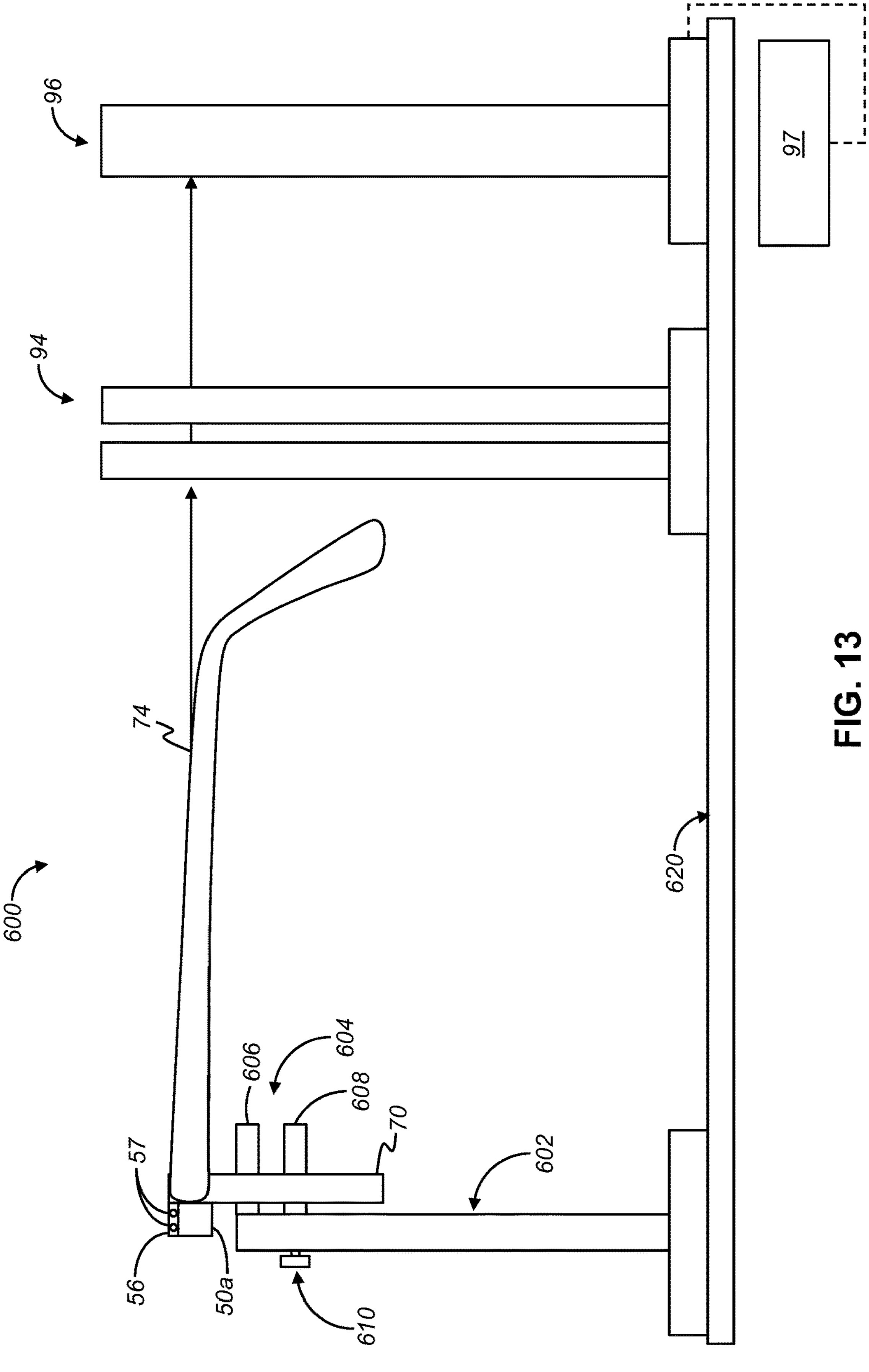
FIG. 13 is a schematic side view of a calibration apparatus according to an exemplary embodiment of the presently disclosed subject matter.
Figure 14:
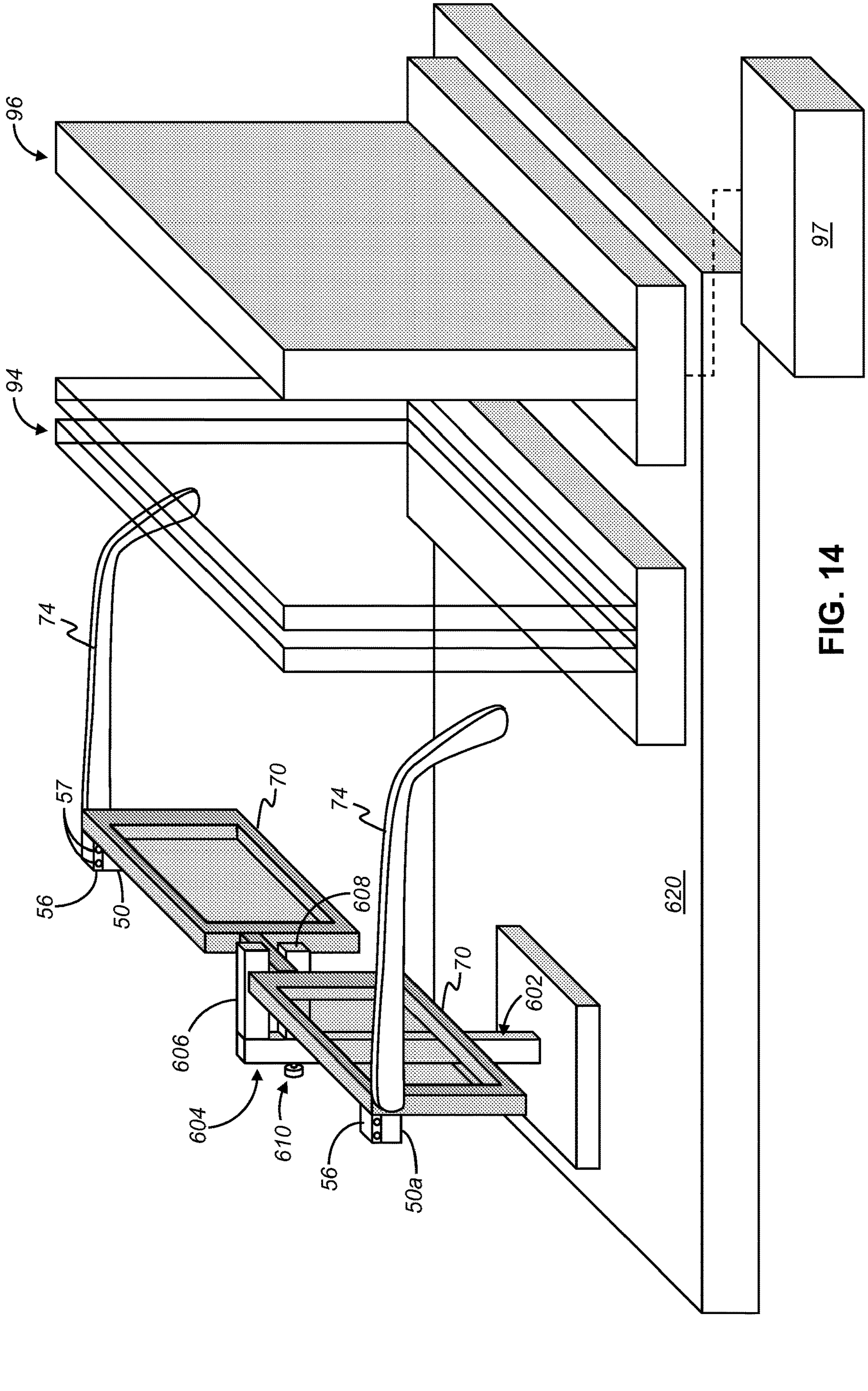
FIG. 14 is a schematic perspective view of a calibration apparatus according to an exemplary embodiment of the presently disclosed subject matter.

Referring now to FIGS. 13 and 14, in an embodiment, calibration of the projectors 50, 50*a* is performed utilizing a calibration apparatus 600. In an embodiment, the calibration apparatus 600 includes a stand 602 operable to hold the near eye display system 80 in a constant position. The stand 602 may also be referred to herein as a stationary alignment mount. For example, the stand 602 may include a clamp mechanism 604. The clamp 604 having an upper finger 606 and a lower finger 608. The lower finger 608 may be operable to move up and down on the stand 602 via a tightening screw 610 to open and close upon the nose bridge 72. In an embodiment, the calibration apparatus 600 includes the objective lens 94 and the performance screen 96. As illustrated in FIGS. 13 and 14, in an embodiment, the stand 602, the objective lens 94, and the performance screen 96 are mounted to a platform 620. The platform 620 maintains the relative position of the stand 602, the objective lens 94, and the performance screen 96 such that the only element(s) to be adjusted during calibration are the projectors 50, 50*a*.

Figure 15:
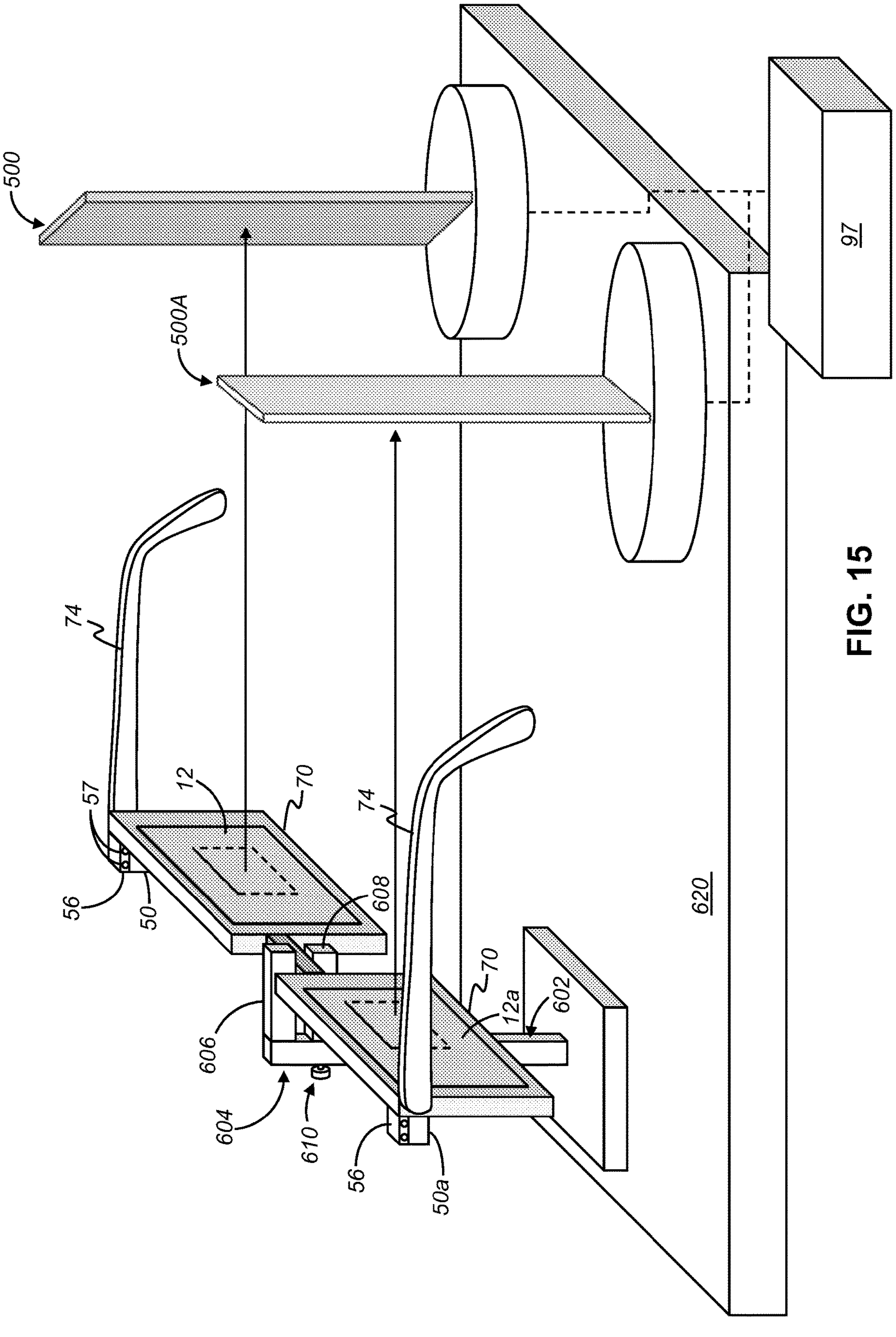
FIG. 15 is a schematic perspective view of a calibration apparatus according to another exemplary embodiment of the presently disclosed subject matter.

As illustrated in FIG. 15, in an embodiment, the calibration apparatus includes cameras 500, 500A for calibration of the projectors 50, 50*a* when the waveguides 12, 12*a* are installed as described in FIG. 9.

Figure 10:
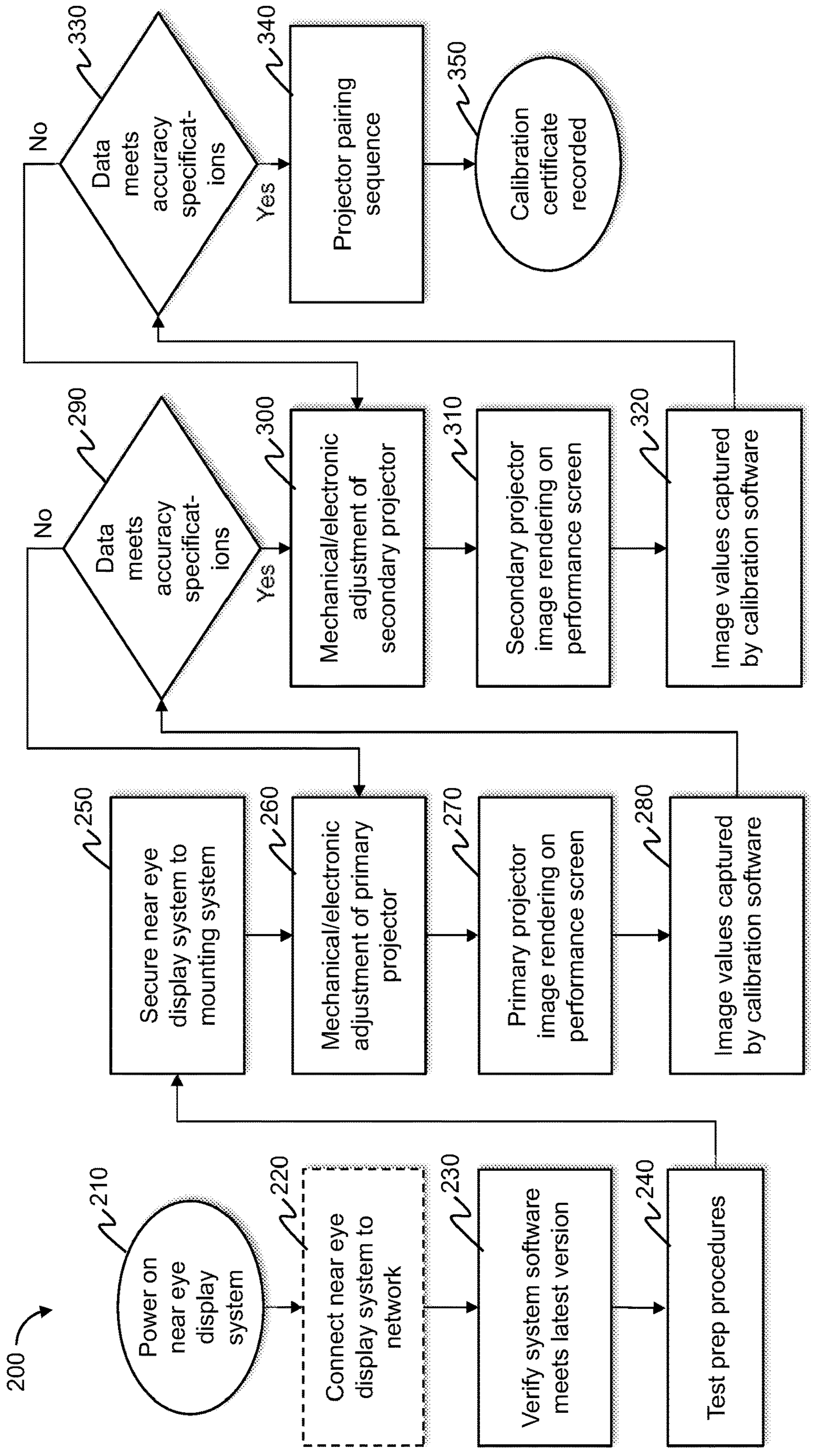
FIG. 10 is a process diagram describing a projector calibration procedure.

FIG. 10 is a flow diagram illustrating a method 200 for aligning and calibrating projectors in a rigid frame binocular system. In step 210 an operator powers on a near eye display system 80. In the next step 220, the near eye display system 80 connects to a local area network (LAN) or a wide area network (WAN), such as a WiFi network, and may pass to a standby state operable to receive system updates. In another embodiment, the near eye display system 80 may bypass connection with a network. In step 230, the operator may verify that the near eye display system software is operating the latest (i.e., most recently updated) operating system ("OS") and calibration software. The operator then initiates system updates as needed. Once verified, the operator initiates general test preparation procedures in step 240. Step 240 may comprise several actions depending on the condition of the test lab and needs of the equipment.

In an embodiment, the test preparation procedure actions may be performed in sequence before proceeding with the remainder of the method for aligning and calibrating projectors in a rigid frame binocular system. In another embodiment, any of the test preparation procedure actions may be performed discretely, out of sequence, repeated any number of times, or omitted. General test preparation procedure actions in step 240 include, but are not limited to, a functional check to ensure basic component functionality is operational, such as LED lights, touchpad input sensor, and projector. Further, the operator may check for mechanical defects that would impact alignment testing, such as temple arm 74, 74*a* warping, tolerance issues, or the detection of physical inconsistencies within the near eye display system The presence of such defects would necessitate a review of the near eye display system at hand and cessation of the calibration process. The operator may check ambient temperature range for optimal conditions, and verify airborne cleanliness specifications meet the Federal Standard 209*c* particulate contaminant rating designated as Class 100 or ISO class 5. In addition, the surface cleanliness of the objective lens 94 and projectors 50, 50*a* may be verified as also meeting Federal Standard 209c particulate contaminant rating designated as Class 100 or ISO class 5. In another embodiment, particulate contaminant ratings may allow for ISO class 6 or greater. Further checks included in step 240 may determine the operability of the performance screen 96, including a screen sensor check and positioning of image reference pixels operable for projector alignment.

Moving to step 250, the operator secures the near eye display system 80 to the stationary mounting system located in the test environment. In step 260, the operator or a mechanical arm may perform fine adjustments of the first projector 50 position. In an embodiment, the first projector 50 refers only to the right temple projector, where for the purposes of the projector calibration scheme, only one projector is aligned at a time. In an embodiment, the left temple projector may be the first projector. In another embodiment, both projectors 50, 50*a* may be calibrated in tandem. Electronic adjustment software may be used to further calibrate projector positioning. In step 270, the mounted near eye display system projects an image upon the performance screen 96 using its first projector 50. In step 280, image values are captured by the performance screen 96 and measured by calibration software. In an embodiment, the performance screen 96 is photosensitive, having photodetector devices operable to measure various properties of a calibration image. In certain embodiments, this step may include calibration with respect to a reference pixel or pre-set factory alignment scheme, as described above.

In step 290, the system and/or test operator evaluates the image data against accuracy specifications such as the example accuracy specifications set forth above. In the case that specifications are not met, the near eye display system alignment method returns to step 260 for further mechanical and/or electronic adjustment based on performance data. In the case that specifications are met, the calibration process proceeds on to step 300 where the operator or a mechanical arm or similar mechanical element attached to the frame may perform fine adjustments of the second projector 50*a* position in advance of attunement with the first projector 50. Electronic adjustment software may be used to further calibrate projector 50*a* positioning. Data received through the performance screen test of the first projector 50 may additionally be used to inform calibration of the second projector 50*a*.

In step 310, the mounted near eye display system 80 projects an image upon the performance screen 96 using its second projector 50*a*. In step 320, image values are captured by the performance screen 96 and measured by calibration software as described above. In step 330, the system and/or test operator evaluates the image data against accuracy specifications to ensure the projectors 50, 50*a* are in proper alignment with each other. In the case that specifications are not met, the near eye display system alignment method returns to step 300 for further mechanical and/or electronic adjustment of second projector 50*a* based on performance data. In the case that specifications are met, a pairing sequence is initiated to lock and record the position of each projector 50, 50*a* as part of the system values in step 340. The system values may be used in the future for internal system alignment procedures. In step 350, the successful projector alignment of near eye display system 80 is recorded with a calibration certificate. Waveguides may be added to the frame after the foregoing embodiment of the method is completed, but may also be added or inserted earlier in the alignment process.

Figure 11B:
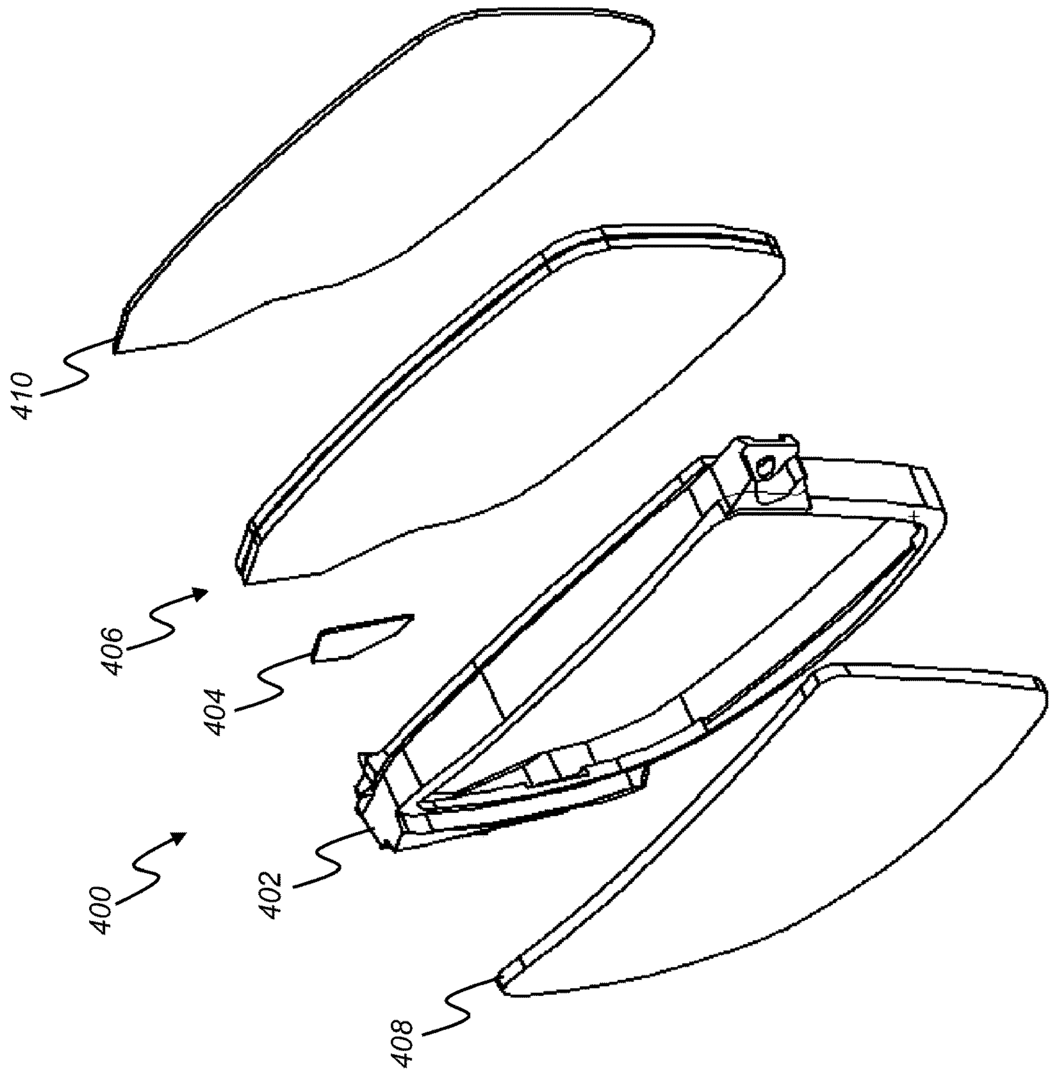
FIG. 11B is an exploded view of the waveguide stack module according to FIG. 11A.
Figure 11A:
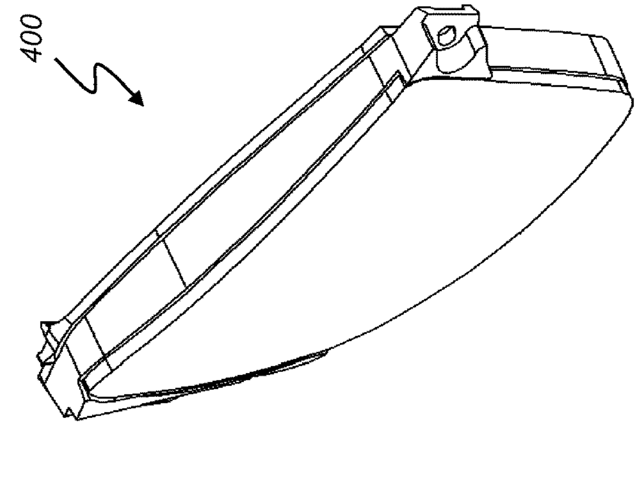
FIG. 11A is a waveguide stack module according to an exemplary embodiment of the presently disclosed subject matter.
Figure 12:
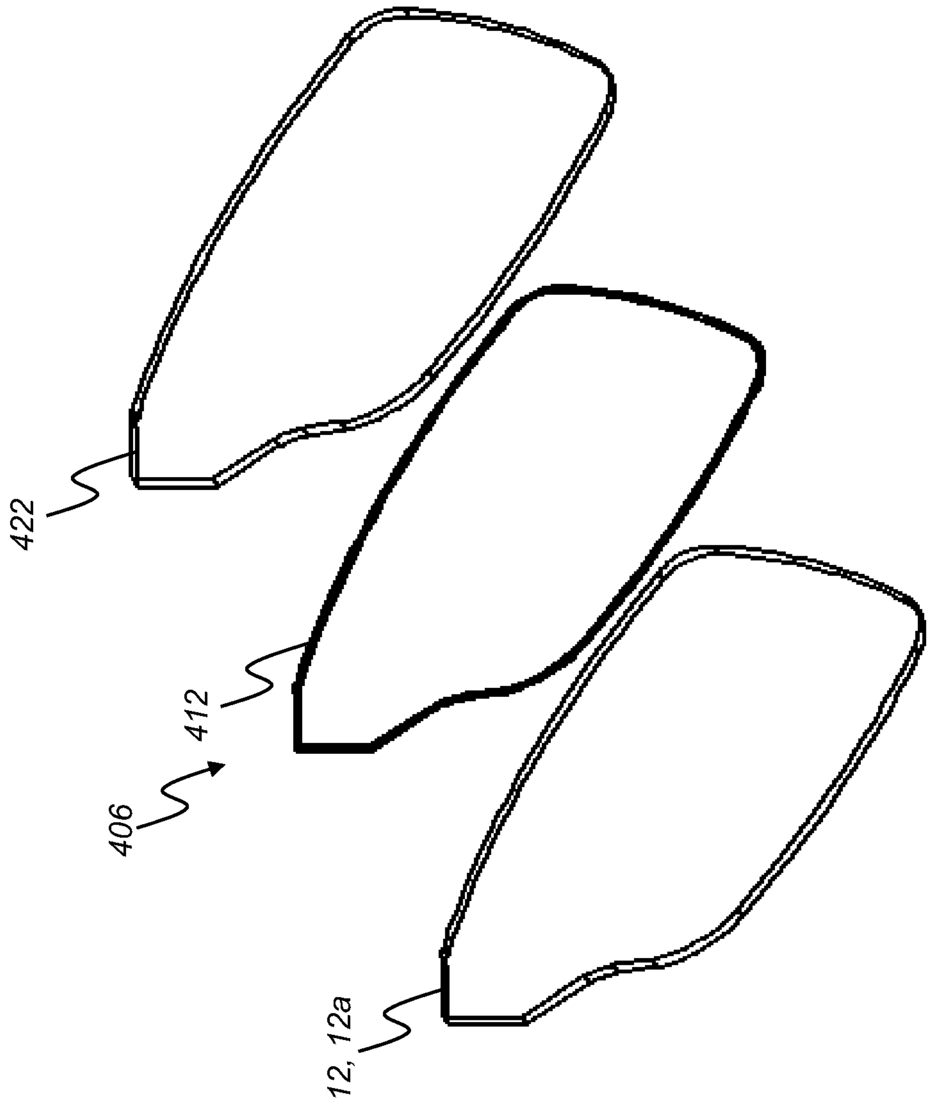
FIG. 12 is an exploded view of a waveguide stack according to an exemplary embodiment of the presently disclosed subject matter.

As illustrated in FIGS. 11A-12, in an embodiment, the waveguides 12, 12*a* are included in a waveguide stack module 400. The waveguide stack module 400 may be utilized in the head mounted near eye display system 80 by connecting the waveguide stack module 400 with the lens frame 70. The waveguide stack module 400 may be environmentally sealed to prevent moister, dirt, and any other particles from getting inside the waveguide stack module 400. In an embodiment, the waveguide stack module 400 includes a waveguide housing 402, a blackening material 404, a waveguide assembly 406, an outer cover 408, and an inner cover 410.

In an embodiment, there is a full perimeter seal between the outer cover 408 and the housing 402 to prevent any debris from entering the enclosed system. Additionally, the outer cover 408 may include an anti-reflective coating thereon to reduce unwanted reflections. The inner cover 410 may also include an anti-reflective coating and/or 'smudge' proof coating thereon. The outer cover 408, the inner cover 410, and the waveguide housing 402 seal the waveguide assembly 406 within he waveguide stack module 400.

The waveguide assembly 406 includes one or more waveguides 12, 22*a* (as described herein). As illustrated in FIG. 12, in an embodiment, the waveguide assembly 406 also includes a second waveguide 422. The waveguide 12, 12*a* and the second waveguide 422 may be separated by a UV light activated material 412 while maintaining parallelism suitable for optical performance.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A method for alignment of images in a near-eye binocular display system, comprising:

providing a substantially rigid binocular frame, operable to support two or more waveguides, wherein each said two or more waveguides comprise:

an in-coupling diffractive optic operable to diffract image-bearing light beams from an image source into said waveguide, and an out-coupling diffractive optic operable to diffract said image-bearing light beams from said waveguide toward an eyebox;

wherein said in-coupling diffractive optic is operable to in-couple light propagating along a first direction, and said out-coupling diffractive optic is operable to out-couple light in said first direction;

positioning a first projector at a first side of said binocular frame to project a first image;

projecting said first image upon a screen without said two or more waveguides supported by said binocular frame;

positioning a second projector on a second side of said frame to project a second image;

projecting said second image upon said screen without said two or more waveguides supported by said binocular frame;

comparing said first image and said second image with respective targets; and adjusting said positioning of at least said first projector or said second projector to align said first image and said second image with said respective targets.

2. The method of claim 1, further comprising providing an intermediary adjustment element operable to receive said first image from said first projector and said second image from said second projector and focus said images upon said screen.

3. The method of claim 2, further comprising refocusing said first image and second image upon said screen, and comparing said refocused images with said respective targets to ensure that said first projector and said second projector are in alignment.

4. The method of claim 2, wherein said intermediary adjustment element is an objective lens.

5. The method of claim 1, wherein said screen is positioned more than one meter and less than four meters from said binocular frame.

6. The method of claim 1, wherein said frame comprises a waveguide replacement port adapted for removable insertion of a waveguide.

7. The method of claim 6, further comprising removably inserting a waveguide in said waveguide replacement port.

8. The method of claim 1, further comprising positioning said first projector to emit image-bearing light in a direction opposite said screen, and providing an optical element to direct said image-bearing light toward said screen.

9. The method of claim 1, wherein said screen comprises photodetectors in communication with a controller operable to measure image properties, said method further comprising:

measuring image properties of said first image with said screen, and comparing said measured image properties to desired image properties;

measuring image properties of said second image with said screen, and comparing said measured image properties to said desired image properties; and comparing said measured image properties from said first image and said second image to ensure that said first projector and said second projector are in alignment.

10. The method of claim 9, wherein said controller is operable to detect misalignment of said first image and said second image.

11. The method of claim 1, further comprising installing one or more waveguides in said rigid binocular frame.

* * * * *